United States Patent
Wang et al.

(10) Patent No.: US 12,262,313 B2
(45) Date of Patent: Mar. 25, 2025

(54) SECONDARY CELL ACTIVATION METHOD AND COMMUNICATION APPARATUS

(71) Applicant: HUAWEI TECHNOLOGIES CO., LTD., Shenzhen (CN)

(72) Inventors: Xiaona Wang, Chengdu (CN); Peng Guan, Shenzhen (CN); Xiaoyong Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 629 days.

(21) Appl. No.: 17/360,123

(22) Filed: Jun. 28, 2021

(65) Prior Publication Data
US 2021/0329546 A1    Oct. 21, 2021

Related U.S. Application Data
(63) Continuation of application No. PCT/CN2019/127468, filed on Dec. 23, 2019.

(30) Foreign Application Priority Data
Dec. 29, 2018  (CN) .......................... 201811647479.2

(51) Int. Cl.
| | |
|---|---|
| H04W 48/20 | (2009.01) |
| H04L 5/00 | (2006.01) |
| H04W 56/00 | (2009.01) |
| H04W 72/04 | (2023.01) |
| H04W 88/02 | (2009.01) |

(52) U.S. Cl.
CPC ............. *H04W 48/20* (2013.01); *H04L 5/001* (2013.01); *H04L 5/0048* (2013.01); *H04L 5/0053* (2013.01); *H04W 72/04* (2013.01); *H04W 56/0045* (2013.01); *H04W 88/02* (2013.01)

(58) Field of Classification Search
None
See application file for complete search history.

(56) References Cited

U.S. PATENT DOCUMENTS

2017/0347270 A1*   11/2017   Iouchi ................... H04L 5/0098
2018/0124687 A1     5/2018   Park et al.
(Continued)

FOREIGN PATENT DOCUMENTS

| CN | 103812625 A | 5/2014 |
|---|---|---|
| CN | 103814543 A | 5/2014 |
| CN | 106105333 A | 11/2016 |

(Continued)

OTHER PUBLICATIONS

Huawei et al: "Cross-carrier beam management", R1-1714336 XP051317121, Aug. 20, 2017, total 7 pages.
(Continued)

*Primary Examiner* — Adolf Dsouza
(74) *Attorney, Agent, or Firm* — Rimon PC

(57) ABSTRACT

In a second cell activation method, a terminal device receives activation signaling of a secondary cell sent by a network device, where the activation signaling includes at least one piece of first quasi co-location indication information; the terminal device activates the secondary cell based on the activation signaling. The technical solution provided in this application can reduce an activation delay of a secondary cell.

18 Claims, 10 Drawing Sheets

(56) References Cited

U.S. PATENT DOCUMENTS

2019/0215136 A1* 7/2019 Zhou .................. H04L 1/1819
2020/0092814 A1* 3/2020 Zhou ................ H04W 52/0235

FOREIGN PATENT DOCUMENTS

| CN | 108370290 A | 8/2018 |
|---|---|---|
| CN | 109788564 A | 5/2019 |

OTHER PUBLICATIONS

Qualcomm Incorporated: "SCell Activation Time", R4-1815931, XP051484503, Nov. 2, 2018, total 3 pages.
3GPP TS 38.133 V15.3.0:"3rd Generation Partnership Project; Technical Specification; 5G; NR; Radio Access Network; Requirements for support of radio resource management(Release 15)",Oct. 2018, ETSI TS 138 133, total 134 pages.
3GPP TS 38.211 V15.3.0 :"3rd Generation Partnership Project; Technical Specification; 5G; NR;Physical channels and modulation(Release 15)",Oct 2018; ETSI TS 138 211,total 98 pages.
3GPP TS 38.212 V15.3.0 :"3rd Generation Partnership Project; Technical Specification; 5G; NR; Multiplexing and channel coding(Release 15)", ETSI TS 138 212; Oct. 2018,total 102 pages.
3GPP TS 38.213 V15.3.0:"3rd Generation Partnership Project; Technical Specification; 5G; NR;Physical layer procedures for control(Release 15)",Oct. 2018, ETSI TS 138 213; total 102 pages.
3GPP TS 38.331 V15.3.0:"3rd Generation Partnership Project; Technical Specification; 5G; NR;Radio Resource Control (RRC) protocol specification(Release 15)",Oct. 2018, ETSI TS 138 331; total 441 pages.

* cited by examiner

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |
| R | \multicolumn{7}{c}{TCI state ID 0} | Oct 5 |
| R | \multicolumn{7}{c}{TCI state ID 1} | Oct 6 |
| \multicolumn{9}{c}{...} |
| R | \multicolumn{7}{c}{TCI state ID n} | Oct N |

FIG. 6

| TCI state ID 6 | $C_7$ | TCI state ID 5 | $C_6$ | TCI state ID 4 | $C_5$ | TCI state ID 3 | $C_4$ | TCI state ID 2 | $C_3$ | TCI state ID 1 | $C_2$ | TCI state ID 0 | $C_1$ | Oct 1 |
|---|---|---|---|---|---|---|---|---|---|---|---|---|---|---|

FIG. 7

| $C_7$ | $C_6$ | $C_5$ | $C_4$ | $C_3$ | $C_2$ | $C_1$ | R | Oct 1 |
|---|---|---|---|---|---|---|---|---|
| R | RS resource set ID 0 ||||||| Oct 2 |
| R | RS resource set ID 1 ||||||| Oct 3 |
| ... |||||||||
| R | RS resource set ID 2 ||||||| Oct N |

FIG. 9

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |
| R | RS resource set ID 0 ||||||| Oct 5 |
| R | RS resource set ID 1 ||||||| Oct 6 |
| ... |||||||||
| R | RS resource set ID n ||||||| Oct N |

FIG. 10

| RS resource set ID 0 | $C_1$ | RS resource set ID 1 | $C_2$ | RS resource set ID 2 | $C_3$ | RS resource set ID 3 | $C_4$ | RS resource set ID 4 | $C_5$ | RS resource set ID 5 | $C_6$ | RS resource set ID 6 | $C_7$ |
|---|---|---|---|---|---|---|---|---|---|---|---|---|---|

Oct 1

FIG. 11

SECONDARY CELL ACTIVATION METHOD AND COMMUNICATION APPARATUS

CROSS-REFERENCE TO RELATED APPLICATIONS

This application is a continuation of International Application No. PCT/CN2019/127468, filed on Dec. 23, 2019, which claims priority to Chinese Patent Application No. 201811647479.2, filed on Dec. 29, 2018. The disclosures of the aforementioned applications are hereby incorporated by reference in their entireties.

TECHNICAL FIELD

This application relates to the field of communication technologies, and more specifically, to a secondary cell activation method and a communication apparatus.

BACKGROUND

In recent years, with the rapid progress of wireless communication technologies, mobile communication systems have developed across generations. To meet an explosive growth of service requirements, various technologies including carrier aggregation (CA) have been introduced to the communication systems. In most cases, a single carrier is used in communication between a terminal device and a network device (for example, a base station). When carrier aggregation is used, a primary carrier and one or more secondary carriers may be used in the communication between the terminal device and the network device. Compared with a data transmission rate when only the primary carrier is used, a data transmission rate in this case can be significantly improved.

In a scenario in which a high-frequency secondary cell and a low-frequency secondary cell cooperate, the high-frequency secondary cell may be used only for data transmission offloading (offloading). To reduce power consumption of the terminal device, the high-frequency secondary cell may be deactivated when the high-frequency secondary cell is not transmitting data.

After receiving activation signaling of the high-frequency secondary cell delivered by the network device, the terminal device performs synchronization signal/physical broadcast channel block (SSB) signal discovery and measurement of the high-frequency secondary cell. Because high-frequency communication is based on data receiving and sending of an analog narrow beam, the terminal device needs to use different receive beams to receive SSB signals through scanning without any beam measurement information, until an SSB signal that meets particular signal quality is detected, to complete uplink and downlink timing synchronization and frequency synchronization of the terminal device in the high-frequency secondary cell and complete activation of the high-frequency secondary cell based on the detected SSB signal and radio resource control (RRC) configuration information. When the high-frequency secondary cell has a plurality of receive beams, a time consumed by the terminal device to determine a receive beam is excessively long. Consequently, an activation delay of the secondary cell is excessively long, and communication quality and reliability are reduced.

Therefore, how to reduce the activation delay of the secondary cell and improve communication quality and reliability becomes an urgent problem to be resolved.

SUMMARY

In view of this, this application provides a secondary cell activation method and a communication apparatus, to reduce an activation delay of a secondary cell.

According to a first aspect, a secondary cell activation method is provided. The method provided in the first aspect may be performed by a terminal device, or may be performed by a chip configured in a terminal device. This is not limited in this application.

Specifically, the method includes: A terminal device receives activation signaling of a secondary cell sent by a network device, where the activation signaling includes at least one piece of first quasi co-location indication information; and the terminal device activates the secondary cell based on the activation signaling.

In some possible implementations, the first quasi co-location indication information includes a transmission configuration indicator state identifier, a pilot resource set identifier, or spatial relation indication information.

In some possible implementations, the method further includes: The terminal device receives a downlink physical channel and/or a downlink signal and/or sends an uplink physical channel and/or an uplink signal in the secondary cell by using a beam indicated by using the first quasi co-location indication information.

In some possible implementations, the terminal device receives second quasi co-location indication information sent by the network device. Further, the terminal device receives a downlink physical channel and/or a downlink signal and/or sends an uplink physical channel and/or an uplink signal in the secondary cell by using a beam indicated by using the second quasi co-location indication information.

In some possible implementations, the activation signaling further includes indication information of a plurality of component carriers, and each of the at least one piece of first quasi co-location indication information corresponds to one or one group of the plurality of component carriers. In some possible implementations, the first quasi co-location indication information includes a transmission configuration indicator state identifier, a pilot resource set identifier, or spatial relation indication information.

In some possible implementations, before that a terminal device receives activation signaling of a secondary cell sent by a network device, the method further includes: The terminal device receives first indication information sent by the network device, where the first indication information is used to indicate that downlink timing of a primary cell is the same as that of the secondary cell, or that a timing advance group (TAG) of a primary cell is the same as that of the secondary cell.

According to the secondary cell activation method in this embodiment of this application, the terminal device activates the secondary cell based on activation signaling that is sent by the network device and that includes the at least one piece of first quasi co-location indication information. In this way, the activation delay of the secondary cell is reduced, and communication quality and reliability are improved.

According to a second aspect, a secondary cell activation method is provided. The method provided in the second aspect may be performed by a network device, or may be performed by a chip configured in a network device. This is not limited in this application.

Specifically, the method includes: A network device generates activation signaling of a secondary cell, where the activation signaling includes at least one piece of first quasi co-location indication information; and the network device sends the activation signaling.

In some possible implementations, the first quasi co-location indication information is used to indicate, to the terminal device, a receive beam of a downlink physical channel and/or a downlink signal, and/or a transmit beam of an uplink physical channel and/or an uplink signal in an activation stage of the secondary cell.

In some possible implementations, the method further includes: The network device sends first quasi co-location indication information, where the first quasi co-location indication information is used to indicate the terminal device to receive a downlink physical channel and/or a downlink signal and/or send an uplink physical channel and/or an uplink signal after receiving the first quasi co-location indication information.

In some possible implementations, the method further includes: The network device sends second quasi co-location indication information, where the second quasi co-location indication information is used to indicate the terminal device to receive a downlink physical channel and/or a downlink signal and/or send an uplink physical channel and/or an uplink signal in the secondary cell by using a beam indicated by using the second quasi co-location indication information.

In some possible implementations, the activation signaling further includes indication information of a plurality of component carriers, and each of the at least one piece of first quasi co-location indication information corresponds to one or one group of the plurality of component carriers. In some possible implementations, the first quasi co-location indication information includes a transmission configuration indicator state identifier, a pilot resource set identifier, or spatial relation indication information.

In some possible implementations, the method further includes: The network device sends first indication information, where the first indication information is used to indicate that downlink timing of a primary cell is the same as that of the secondary cell, or that a timing advance group (TAG) of a primary cell is the same as that of the secondary cell.

According to a third aspect, a secondary cell activation method is provided. The method provided in the third aspect may be performed by a terminal device, or may be performed by a chip configured in a terminal device. This is not limited in this application.

Specifically, the method includes: A terminal device receives radio resource control (RRC) configuration signaling, where the RRC configuration signaling includes synchronization signal/physical broadcast channel block (SSB) resource information and quasi co-location indication information of an SSB resource; and the terminal device activates a secondary cell based on the quasi co-location indication information.

In some possible implementations, the terminal device receives activation signaling of the secondary cell, and that the terminal device activates the secondary cell based on the quasi co-location indication information includes: The terminal device activates the secondary cell based on the activation signaling and the quasi co-location indication information.

In some possible implementations, the terminal device receives second indication information, where the second indication information is used to indicate that downlink timing of a primary cell is the same as that of the secondary cell, and/or that a timing advance group (TAG) of a primary cell is the same as that of the secondary cell.

According to a fourth aspect, a secondary cell activation method is provided. The method provided in the fourth aspect may be performed by a network device, or may be performed by a chip configured in a network device. This is not limited in this application.

Specifically, the method includes: A network device generates radio resource control (RRC) configuration signaling, where the RRC configuration signaling includes synchronization signal/physical broadcast channel block (SSB) resource information and quasi co-location indication information of an SSB resource; and the network device sends the RRC configuration signaling.

In some possible implementations, the method further includes: The network device sends activation signaling of a secondary cell.

In some possible implementations, the network device sends second indication information, where the second indication information is used to indicate that downlink timing of a primary cell is the same as that of the secondary cell, and/or that a timing advance group (TAG) of a primary cell is the same as that of the secondary cell.

According to a fifth aspect, a communication apparatus is provided. The apparatus includes units configured to perform steps in the method according to any one of the first aspect or the possible implementations of the first aspect, or includes units configured to perform steps in the method according to any one of the third aspect or the possible implementations of the third aspect.

According to a sixth aspect, a communication apparatus is provided. The apparatus includes units configured to perform steps in the method according to any one of the second aspect or the possible implementations of the second aspect, or includes units configured to perform steps in the method according to any one of the fourth aspect or the possible implementations of the fourth aspect.

According to a seventh aspect, a communication device is provided. A structure of the communication device includes a processor. The processor is configured to support the communication device in performing the functions in the first aspect to the fourth aspect and the implementations of the first aspect to the fourth aspect. In a possible design, the communication device may further include a transceiver, and the transceiver is configured to support the communication device in receiving or sending information.

In a possible design, the communication device may further include a memory. The memory is configured to be coupled to the processor, and stores program instructions and data that are necessary for the communication device.

In other words, the communication device includes a memory and a processor. The memory is configured to store a computer program, and the processor is configured to invoke and run the computer program, so that the communication device performs the communication method in any one of the first aspect to the fourth aspect and the implementations of the first aspect to the fourth aspect.

According to an eighth aspect, a computer program product is provided. The computer program product includes a computer program. When executed by a processor, the computer program is configured to perform the communication method in any one of the possible implementations of the first aspect to the fourth aspect.

According to a ninth aspect, a computer-readable storage medium is provided. The computer-readable storage medium stores a computer program. When being executed, the computer program is used to perform the method in any one of the possible implementations of the first aspect to the fourth aspect, or perform the method in any one of the third aspect or the possible implementations of the third aspect.

According to a tenth aspect, a computer-readable storage medium is provided. The computer-readable storage medium stores a computer program. When being executed, the computer program is used to perform the method in any one of the first aspect or the possible implementations of the first aspect, perform the method in any one of the second aspect or the possible implementations of the second aspect, perform the method in any one of the third aspect or the possible implementations of the third aspect, or perform the method in any one of the fourth aspect or the possible implementations of the fourth aspect.

BRIEF DESCRIPTION OF DRAWINGS

FIG. 4 is a schematic flowchart of a secondary cell activation method according to an embodiment of this application;

FIG. 5 to FIG. 7 are three formats of activation signaling of a MAC CE secondary cell according to an embodiment of this application;

FIG. 9 to FIG. 11 are three formats of activation signaling of a MAC CE secondary cell according to another embodiment of this application;

DESCRIPTION OF EMBODIMENTS

Figures 1, 2, 3:
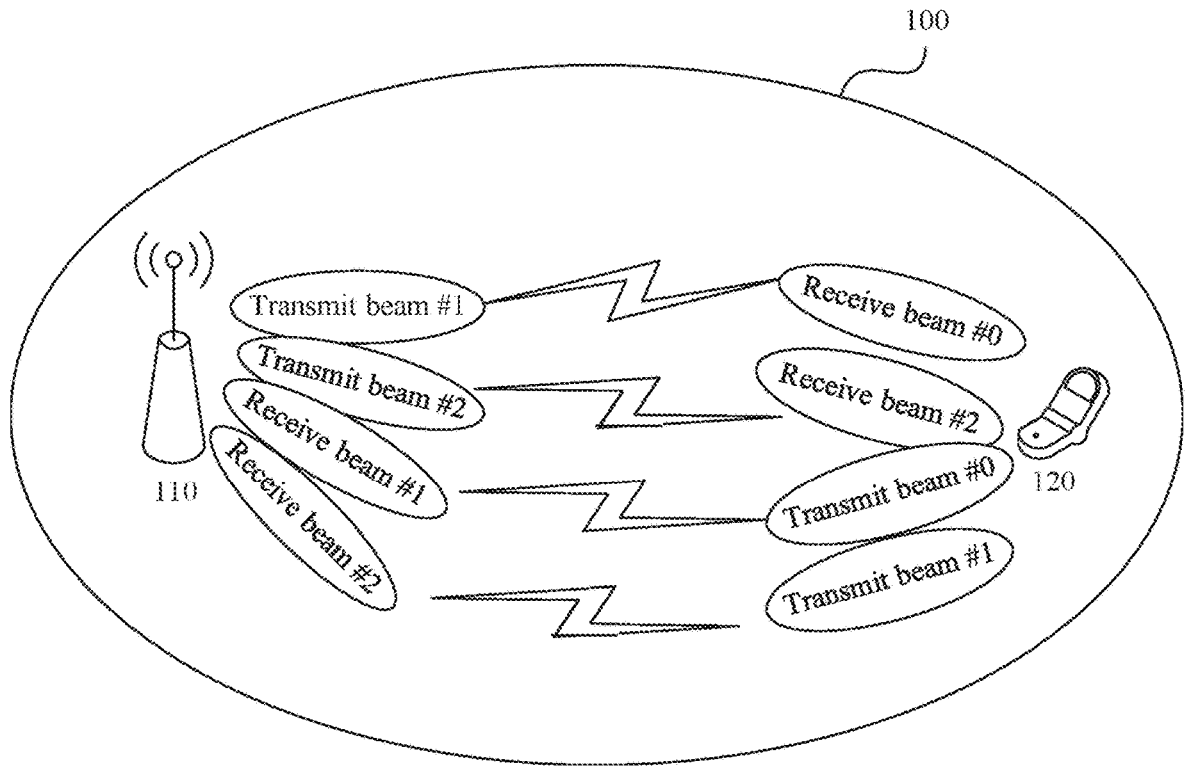
FIG. 1 is a schematic diagram of an application scenario according to an embodiment of this application.
FIG. 2 and FIG. 3 are two existing formats of activation signaling of a MAC CE secondary cell.

The following describes technical solutions of this application with reference to accompanying drawings.

The technical solutions of the embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, or a new radio (NR) system.

A terminal device in the embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communication (GSM) system or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay node, an access point, a vehicle-mounted device, a wearable device, a network device in a 5G network, a network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process (process), for example, a Linux operating system, a Unix operating system, an Android operating system, an iOS operating system, or a windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable medium" may include but is not limited to a radio channel, and various other media that can store, include, and/or carry instructions and/or data.

For ease of understanding the embodiments of this application, a communication system applicable to the embodiments of this application is first described in detail with reference to FIG. 1.

FIG. 1 is a schematic diagram of a communication system 100 applicable to an embodiment of this application. As shown in FIG. 1, the communication system 100 includes at least one network device 110 and at least one terminal device 120. In the communication system 100, the terminal device and the network device may obtain one or more beam pairs that enable better communication in a beam management process. The beam pairs are <Bx, B'x> and <By, B'y>, where Bx represents a transmit beam of the network device, B'x represents a receive beam of the terminal device, By represents a transmit beam of the terminal device, and B'y represents a receive beam of the network device. For example, referring to FIG. 1, a transmit beam #1 of the network device and a receive beam #0 of the terminal device are a beam pair, and a transmit beam #2 of the network device and a receive beam #2 of the terminal device are a beam pair. A transmit beam #0 of the terminal device and a receive beam #1 of the network device are a beam pair, and a transmit beam #1 of the terminal device and a receive beam #2 of the network device are a beam pair.

In the communication system 100, beams of the terminal device 120 and the network device 110 need to be aligned to normally perform communication. Because the terminal device and the network device each can face toward a plurality of beam directions, a prerequisite for communication is that there is a correct beam indication. Specifically, in downlink communication, the network device needs to notify the terminal device of a receive beam to be used to receive a signal sent by the network device subsequently, or notify the terminal device of a transmit beam used by the network device to send a signal subsequently. In uplink communication, the network device needs to notify the terminal device of a transmit beam to be used to send an uplink physical channel and/or an uplink signal, or notify the terminal device of a receive beam used by the network device to receive a signal sent by the terminal. For example, in downlink transmission, the network device may notify the terminal device that the network device performs the transmission by using the transmit beam #1, so that the terminal device needs to perform receiving by using the receive beam #0. Alternatively, the network device performs the transmission by using the transmit beam #1, and notifies the terminal device to use the receive beam #0 to perform receiving. For another example, in uplink transmission, the network device may notify the terminal device to use the transmit beam #0 to perform the transmission, so that the network device performs receiving by using the receive beam #1. Alternatively, the network device may notify that a receive beam used by the network device is the receive beam #0, so that the terminal device needs to perform the transmission by using the transmit beam #0.

For ease of understanding the embodiments of this application, the following first briefly describes several terms in this application.

1. Beam: The beam is a communication resource. The beam may be a wide beam, a narrow beam, or another type of beam. A technology for forming the beam may be a beamforming (beamforming) technology or another technical means. The beamforming technology may be specifically a digital beamforming technology, an analog beamforming technology, or a hybrid digital/analog beamforming technology. Different beams may be considered as different resources. Same information or different information may be sent on different beams. Optionally, a plurality of beams with a same communication feature or similar communication features may be considered as one beam. One beam may include one or more antenna ports, configured to transmit a data channel, a control channel, a sounding signal, and the like.

A beam may alternatively be understood as a spatial resource, and may be a transmit or receive precoding vector with energy transmission directivity. The energy transmission directivity may indicate that a signal, received in a spatial position and on which precoding processing has been performed by using the precoding vector, has a relatively good receive power, for example, meets a received demodulation signal-to-noise ratio. The energy transmission directivity may also indicate that same signals sent from different spatial positions and received by using the precoding vector have different receive powers. A same device (for example, a network device or a terminal device) may have different precoding vectors, and different devices may also have different precoding vectors, in other words, the different devices correspond to different beams. For a configuration or a capability of a device, one device may use one or more of a plurality of different precoding vectors at a same moment, in other words, one or more beams may be formed at a same time. For transmitting and receiving, beams can be classified into transmit beams and receive beams.

Transmit beam: The transmit beam is a directional beam transmitted through a plurality of antennas by using the beamforming technology.

Receive beam: The receive beam is also directional in a direction of receiving a signal, and is directed to a transmitting direction of the transmit beam as much as possible, to further improve a received signal-to-noise indicator and avoid interference between users.

A beam may also be referred to as a spatial filter (spatial filter), or referred to as a spatial filter (spatial filter) or a spatial parameter (spatial parameters). A transmit beam may also be referred to as a spatial transmit filter, and a receive beam may also be referred to as a spatial receive filter.

2. Beam pairing relationship: The beam pairing relationship is a pairing relationship between a transmit beam and a receive beam, namely, a pairing relationship between a spatial domain transmit filter and a spatial domain receive filter. A relatively large beamforming gain can be obtained by transmitting a signal between the transmit beam and the receive beam that have the beam pairing relationship.

In an implementation, a transmit end and a receive end may obtain a beam pairing relationship through beam training. Specifically, the transmit end may send a reference signal in a beam sweeping manner, and the receive end may also receive a reference signal in the beam sweeping manner. Specifically, the transmit end may form different directional beams in space through beamforming, and may perform polling on a plurality of different directional beams, to transmit the reference signal by using the different directional beams, so that power of transmitting the reference signal can reach a maximum value in a direction directed by the transmit beam. The receive end may also form different directional beams in space through beamforming, and may perform polling on a plurality of different directional beams, to receive the reference signal by using the different directional beams, so that power of receiving the reference signal by the receive end can reach a maximum value in a direction directed by the receive beam.

By traversing each transmit beam and receive beam, the receive end may perform channel measurement based on the received reference signal, and report, through channel state information (CSI) to the transmit end, a result obtained through measurement. For example, the receive end may report, to the transmit end, a part of reference signal resources with relatively large reference signal received power (RSRP), for example, report an identifier of the reference signal resource, so that the transmit end sends and receives a signal by using a beam pairing relationship with relatively good channel quality during data or signaling transmission.

3. Reference signal and reference signal resource: The reference signal may be used for channel measurement, channel estimation, or the like. The reference signal resource may be used to configure a transmission attribute of the reference signal, for example, a time-frequency resource location, a port mapping relationship, a power factor, and a scrambling code. For details, refer to the current technology. A transmit end device may send a reference signal based on a reference signal resource, and a receive end device may receive a reference signal based on a reference signal resource.

The channel measurement in this application also includes beam measurement. To be specific, beam quality information is obtained by measuring a reference signal. A parameter used to measure beam quality includes RSRP, but is not limited thereto. For example, beam quality may also be measured by using parameters such as reference signal received quality (RSRQ), a signal-to-noise ratio (SNR), and signal to interference plus noise ratio (SINR). In the embodiments of this application, for ease of description, unless otherwise specified, the channel measurement may be considered as the beam measurement.

The reference signal may include, for example, a channel state information reference signal (CSI-RS), a synchronization signal block (SSB), a sounding reference signal (SRS), an uplink control channel demodulation reference signal (PUCCH-DMRS), an uplink shared channel demodulation reference signal (PUSCH-DMRS), an uplink phase noise tracking reference signal (PTRS), a physical broadcast channel demodulation reference signal (PBCH-DMRS), a downlink control channel demodulation reference signal (PDCCH-DMRS), a downlink shared channel demodulation reference signal (PDSCH-DMRS), a cell reference signal (CRS) (not available in NR), and a fine synchronization signal (TRS) (not available in LTE). Correspondingly, the reference signal resource may include a CSI-RS resource (CSI-RS resource), an SSB resource (SSB resource), an SRS resource (SRS resource), a TRS resource, a DMRS resource, and a CRS resource.

It should be noted that the foregoing SSB may also be referred to as a synchronization signal/physical broadcast channel block (SS/PBCH block), and the corresponding SSB resource may also be referred to as a synchronization signal/physical broadcast channel block resource (SS/PBCH block resource) that may be referred to as an SSB resource for short.

To distinguish between different reference signal resources, each reference signal resource may correspond to one identifier of a reference signal resource, for example, a CSI-RS resource identifier (CRI), an SSB resource identifier (SSBRI), an SRS resource index (SRI), a TRS resource index (TRI), a DMRS resource index (DRI), and a CRS resource index (CRSRI).

The SSB resource identifier may also be referred to as an SSB index (SSB index).

It should be understood that the reference signals and the corresponding reference signal resources enumerated above are merely examples for description, and shall not constitute any limitation on this application. This application does not exclude a possibility of defining another reference signal in a future protocol to implement a same or similar function.

4. Antenna port (antenna port): The antenna port is referred to as a port for short. The port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port. An antenna port is a logical concept. One antenna port may correspond to one physical transmit antenna, or may correspond to a plurality of physical transmit antennas. In both cases, a receiver (receiver) of a terminal does not decompose a signal from a same antenna port. This is because from a perspective of the terminal, regardless of whether a channel is formed by using a single physical transmit antenna or is combined by using a plurality of physical transmit antennas, the antenna port is defined by a reference signal (RS) corresponding to the antenna port. For example, an antenna port corresponding to a demodulation reference signal (DMRS for short) is a DMRS port, and the terminal may obtain a channel estimation of the antenna port based on the reference signal. Each antenna port corresponds to one time/frequency resource grid (time/frequency resource grid), and each antenna port has an independent reference signal. One antenna port is one channel, and the terminal needs to perform channel estimation and data demodulation based on the reference signal corresponding to the antenna port.

5. Quasi co-location (QCL): Signals corresponding to antenna ports that have a QCL relationship have a same parameter, or a parameter of one antenna port may be used to determine a parameter of another antenna port that has a QCL relationship with the antenna port, or two antenna ports have a same parameter, or a parameter difference between two antenna ports is less than a threshold. The parameter may include one or more of the following: a delay spread (delay spread), a Doppler spread (Doppler spread), a Doppler shift (Doppler shift), an average delay (average delay), an average gain, and a spatial reception parameter (spatial Rx parameter). The spatial reception parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource identifier.

The foregoing angles may be decomposition values at different dimensions or a combination of decomposition values at different dimensions. The antenna ports are antenna ports having different antenna port numbers, antenna ports that have a same antenna port number and that are used to send or receive information at different times, on different frequencies, and/or on different code domain resources, and/or antenna ports that have different antenna port numbers and that are used to send or receive information at different times, on different frequencies, and/or on different code domain resources. The resource identifier may include: a CSI-RS resource identifier, an SRS resource identifier, an SSB resource identifier, a resource identifier of a preamble sequence transmitted on a physical random access channel (PRACH), or a resource identifier of a demodulation reference signal (DMRS), used to indicate a beam on a resource.

In the NR protocol, the QCL relationship may be classified into the following four types based on different parameters:

type A (type A): the Doppler shift, the Doppler spread, the average delay, and the delay spread;
type B (type B): the Doppler shift and the Doppler spread;
type C (type C): the Doppler shift and the average delay; and
type D (type D): the spatial reception parameter.

The QCL in the embodiments of this application is QCL of the type D. Unless otherwise specified in the following, the QCL may be understood as the QCL of the type D, namely, QCL defined based on the spatial reception parameter.

When the QCL relationship is a QCL relationship of the type D, the QCL relationship may be considered as spatial QCL. When antenna ports have a spatial QCL relationship, a QCL relationship between a port of a downlink physical channel and/or a downlink signal and a port of a downlink physical channel and/or a port of a downlink signal, or between a port of an uplink physical channel and/or an uplink signal and a port of an uplink physical channel and/or an uplink signal may be that the two signals have a same AOA or AOD, which is used to indicate that the two signals have a same receive beam or transmit beam. For another example, for a QCL relationship between a port of a downlink physical channel and/or a downlink signal and a port of an uplink physical channel and/or a port of a downlink signal, or between a port of an uplink physical channel and/or an uplink signal and a port of a downlink physical channel and/or a downlink signal may be that AOAs or AODs of the two signals have a correspondence relationship that is, by using reciprocity of beams, an uplink transmit beam is determined based on a downlink receive beam, or a downlink receive beam is determined based on an uplink transmit beam.

From a perspective of the transmit end, if two antenna ports are spatial QCLed, it may mean that corresponding beam directions of the two antenna ports are consistent in space. From a perspective of the receive end, if two antenna ports are spatial QCLed, it may mean that the receive end can receive, in a same beam direction, signals sent by using the two antenna ports.

Signals transmitted on ports having a spatial QCL relationship may further have corresponding beams. The corresponding beam includes at least one of the following: a same receive beam, a same transmit beam, a transmit beam corresponding to a receive beam (corresponding to a reciprocity scenario), or a receive beam corresponding to a transmit beam (corresponding to a reciprocity scenario).

Signals transmitted on ports having a spatial QCL relationship may alternatively be understood as signals received or sent by using a same spatial filter (spatial filter). The spatial filter may be at least one of the following: precoding, a weight of an antenna port, a phase deflection of the antenna port, and an amplitude gain of the antenna port.

Signals transmitted on ports having a spatial QCL relationship may alternatively be understood as having corresponding beam pair links (BPL). The corresponding BPL includes at least one of the following: a same downlink BPL, a same uplink BPL, an uplink BPL corresponding to a downlink BPL, or a downlink BPL corresponding to an uplink BPL.

Therefore, the spatial reception parameter (namely, the QCL of the type D) may be understood as a parameter used to indicate direction information of a receive beam.

6. Quasi co-location assumption (QCL assumption): The QCL assumption means that it is assumed that whether there is a QCL relationship between two ports. Configuration and indication of the quasi co-location assumption may be used to help the receive end to receive and demodulate a signal. For example, the receive end can assume that there is a QCL relationship between a port A and a port B. To be specific, a large-scale parameter that is of a signal measured on the port A may be used for signal measurement and demodulation on the port B. The large-scale parameter may include the parameter of the antenna ports.

7. Transmission configuration indicator (TCI) state: The TCI state may be used to indicate a QCL relationship between two types of reference signals. Each TCI state may include a serving cell index (SCI), a bandwidth part (BWP) identifier (ID), and a reference signal resource identifier. The reference signal resource identifier may be, for example, at least one of the following: a non-zero power (NZP) CSI-RS reference signal resource identifier (NZP-CSI-RS-ResourceId), a non-zero power CSI-RS pilot resource set identifier (NZP-CSI-RS-ResourceSetId), or an SSB index (SSB-Index).

The serving cell index, the BWP ID, and the reference signal resource identifier indicate a reference signal resource used in the beam training process, and a serving cell and a BWP that correspond to the reference signal resource. In the beam training process, the network device sends reference signals by using different transmit beams based on different reference signal resources, and therefore, the reference signals sent by using the different transmit beams may be associated with the different reference signal resources; the terminal device receives reference signals by using different receive beams based on different reference signal resources, and therefore, the reference signals received by using the different receive beams may also be associated with the different reference signal resources. Therefore, in the beam training process, the terminal device may maintain a correspondence between each of the serving cell index, the BWP ID, and the reference signal resource identifier and a receive beam, and the network device may maintain a correspondence between each of the serving cell index, the BWP ID, and the reference signal resource identifier and a transmit beam. The pairing relationship between the receive beam and the transmit beam may be established by using the reference signal resource identifier.

In a subsequent communication process, the terminal device may determine the receive beam based on a TCI state indicated by the network device, and the network device may determine the transmit beam based on the same TCI state.

In addition, the TCI state may be globally configured. In TCI states configured for different cells and different BWPs, if indexes of the TCI states are the same, configurations of the corresponding TCI states are also the same.

8. TCI: The TCI may be used to indicate a TCI state.

In an implementation, a network device may configure a TCI state (TCI state) list for the terminal device by using higher layer signaling (for example, an RRC message). For example, the network device may configure the TCI state list for the terminal device by using tci-StatesToAddModList (tci-StatesToAddModList) in the RRC message. The TCI state list may include a plurality of TCI states. For example, the network device may configure a maximum of 64 TCI states for each BWP in each cell.

For example, a structure of the TCI is as follows:

```
TCI-State ::=                   SEQUENCE {
   tci-StateId                     TCI-StateId,
   qcl-Type1                       QCL-Info,
   qcl-Type2                       QCL-Info
   ...
}
QCL-Info ::=                    SEQUENCE {
   cell                            ServCellIndex
   bwp-Id                          BWP-Id
   referenceSignal                 CHOICE {
      csi-rs                          NZP-CSI-RS-ResourceId,
      ssb                             SSB-Index,
      csi-RS-for-tracking             NZP-CSI-RS-ResourceSetId
   },
   qcl-Type                     ENUMERATED {typeA, typeB, typeC, typeD},
   ...
}
```

The TCI may include a plurality of parameters, for example, a cell number, a bandwidth part number, a reference signal identifier, a synchronization signal block identifier, and a quasi co-location (QCL) type.

Thereafter, the network device may activate one or more TCI states by using higher layer signaling, such as a media access control control element (MAC CE). The one or more activated TCI states are a subset of the TCI state list configured by using the RRC message. For example, the network device may activate a maximum of eight TCI states for each BWP in each cell.

Then, the network device may further indicate a selected TCI state by using a TCI field in physical layer signaling (for example, downlink control information (DCI)). The DCI may be, for example, DCI applicable to scheduling a physical downlink resource.

Configuration information of one TCI state may include one or two reference signal resource identifiers and a QCL type associated with the reference signal resource identifier. When the QCL relationship is configured to be one of type A, type B, or type C, the terminal device may demodulate a PDCCH or a physical downlink shared channel (PDSCH) based on a TCI state indication. When a QCL relationship is configured to be of the type D, the terminal device may learn of a transmit beam used by the network device to send a signal, and may further determine, based on the beam pairing relationship determined through the channel measurement described above, a receive beam used to receive a signal. The terminal device may determine, based on a TCI field in DCI on the physical downlink control channel (PDCCH), a receive beam for receiving the PDSCH.

Based on the TCI state indication, the terminal device determines a receive beam of a downlink physical channel and/or a downlink signal, or determines a transmit beam of an uplink physical channel and/or an uplink signal. The downlink physical channel and/or the downlink signal may be one or more of the following: a synchronization signal, a broadcast channel, a broadcast signal demodulation signal, a synchronization signal/physical broadcast channel block (SSB), a channel state information reference signal (CSI-RS), a cell-specific reference signal (CS-RS), a UE-specific reference signal (US-RS), a downlink control channel demodulation reference signal (DMRS), a downlink data channel demodulation reference signal, and a downlink phase noise tracking signal. The uplink physical channel and/or the uplink signal may be one or more of the following: an uplink random access sequence, an uplink sounding reference signal (SRS), an uplink control channel demodulation reference signal, an uplink data channel demodulation reference signal, and an uplink phase noise tracking signal.

It should be noted that, when a serving cell indicated in the TCI state and a serving cell scheduled to transmit the downlink physical channel and/or the downlink signal to the terminal device may be different serving cells, for example, the serving cell indicated in the TCI state is a cell #0, and a configured reference signal is NZP-CSI-RS-ResourceId#0, while a serving cell scheduled to transmit the downlink physical channel and/or the downlink signal to the terminal device is a cell #1, the terminal device may alternatively determine the receive beam based on the TCI state. A transmit beam of NZP-CSI-RS-ResourceId#0 indicated by the TCI state is a transmit beam of a network device of the cell #0, for example, denoted as a transmit beam #0. The terminal device may determine, based on a downlink receive beam of the cell #0, a receive beam of a downlink physical channel and/or a downlink signal of the cell #1, or a transmit beam of an uplink physical channel and/or an uplink signal of the cell #1.

In a specific implementation, the terminal device may directly receive the downlink physical channel and/or the downlink signal of the cell #1 by using a downlink receive beam used to receive the pilot resource NZP-CSI-RS-ResourceId#0 of the serving cell #0.

In a specific implementation, the terminal device may determine the receive beam of the downlink physical channel and/or the downlink signal of the cell #1 based on a direction of the downlink receive beam #0 used to receive the pilot resource NZP-CSI-RS-ResourceId#0 of the serving cell #0. For example, a receive beam having a main lobe pointing angle same as the receive beam #0, a receive beam having a beam coverage with a width of 3 dB same as or similar to that of the receive beam #0, or an omnidirectional receive beam may be chosen to receive the downlink physical channel and/or the downlink signal of the cell #1.

In a specific implementation, the terminal device determines the transmit beam of the uplink physical channel and/or the uplink signal of the cell #1 based on a direction of the downlink receive beam #0 used to receive the pilot resource NZP-CSI-RS-ResourceId#0 of the serving cell #0. For example, a transmit beam having a main lobe pointing angle same as the receive beam #0, a transmit beam having a beam coverage with a width of 3 dB same as or similar to that of the receive beam #0, or an omnidirectional transmit beam may be chosen to send the downlink physical channel and/or the downlink signal of the cell #1.

9. Spatial relation (SR): The spatial relation may also be referred to as an uplink TCI (UL TCI). Similar to the TCI described above, a spatial relation may be used to determine a transmit beam of an uplink physical channel and/or an uplink signal. The spatial relation may be determined through beam training. A reference signal used for the beam training may be, for example, an uplink reference signal such as a sounding reference signal (SRS), or may be a downlink reference signal such as the SSB or CSI-RS enumerated above.

Each spatial relation may include a serving cell index (ServCellIndex) and a reference signal resource identifier. The reference signal resource identifier may be, for example, any one of the following: a downlink BWP ID (downlink BWP ID) and an SSB index (SSB-Index), a downlink BWP ID and a non-zero power CSI-RS reference signal resource identifier (NZP-CSI-RS-ResourceId), or an uplink BWP ID and an SRS resource identifier (SRS-ResourceId).

The serving cell index, the BWP ID, and the reference signal resource identifier indicate a reference signal resource used in the beam training process, and a serving cell and a BWP that correspond to the reference signal resource. One spatial relation is used to determine one transmit beam. To be specific, one serving cell index, one BWP ID, and one reference signal resource may be used to determine one transmit beam. A terminal device may maintain, in the beam training process, a correspondence between each of the serving cell index, the BWP ID, and the reference signal resource identifier and the transmit beam. A network device may maintain, in the beam training process, a correspondence between each of the serving cell index, the BWP ID, and the reference signal resource identifier and a receive beam. A pairing relationship between the transmit beam and the receive beam may be established by using the reference signal resource identifier.

In a subsequent communication process, the terminal device may determine a transmit beam based on a spatial relation indicated by the network device, and the network device may determine a receive beam based on the same spatial relation.

In addition, each spatial relation may further include power control information. The power control information may include, for example, at least one of the following: expected receive power, a path loss reference signal, and a path loss compensation parameter α. The terminal device may determine, based on the power control information, a transmit power to be used to send the uplink physical channel and/or the uplink signal.

In addition, the spatial relation may be globally configured. In spatial relations configured for different cells and different BWPs, if identifiers of the spatial relations are the same, configurations of corresponding spatial relations are also the same.

```
PUCCH-SpatialRelationInfo ::=    SEQUENCE {
    pucch-SpatialRelationInfoId      PUCCH-SpatialRelationInfoId,
    servingCellId                    ServCellIndex
OPTIONAL, -- Need S
    referenceSignal                  CHOICE {
        ssb-Index                        SSB-Index,
        csi-RS-Index                     NZP-CSI-RS-ResourceId,
        srs                              SEQUENCE {
                                             resource
SRS-ResourceId,
                                             uplinkBWP
BWP-Id
                                         }
```

-continued

```
    },
    pucch-PathlossReferenceRS-Id     PUCCH-PathlossReferenceRS-Id,
    p0-PUCCH-Id                      P0-PUCCH-Id,
P0-PUCCH-Id,
```

In an implementation, the network device may configure a spatial relation list for the terminal device by using higher layer signaling (for example, an RRC message). The spatial relation list may include a plurality of spatial relations. For example, the network device may configure a maximum of 64 spatial relations for each BWP in each cell.

Then, the network device may activate one or more spatial relations by using higher layer signaling (for example, a MAC CE). The activated spatial relation is a subset of the spatial relation list configured by using the RRC message. For example, the network device may activate a maximum of eight TCI states for each BWP in each cell. A specific manner in which the network device activates the spatial relation by using the MAC CE is the same as the specific manner of activating the TCI state. The specific manner of activating the TCI state by using the MAC CE has been described in detail above. For brevity, details are not described herein again. Based on activation of the MAC CE, the terminal device may determine a mapping relationship between an uplink physical channel and/or an uplink signal and at least one spatial relation.

Then the network device may indicate a selected spatial relation by using an SRI (SRS resource indicator) field in physical layer signaling (such as DCI). The DCI may be, for example, DCI used for scheduling an uplink grant (UL grant) resource. The terminal device may determine the selected spatial relation based on the foregoing mapping relationship between the uplink physical channel and/or the uplink signal and the at least one spatial relation and a corresponding SRI.

Similar to downlink TCI, configuration information of one spatial relation may include identifiers of one or two reference signal resources, and the terminal device may determine, based on the spatial relation indication information, a transmit beam of an uplink physical channel and/or an uplink signal, or a receive beam of a downlink physical channel and/or a downlink signal.

In addition, the configuration information of one spatial relation may include identifiers of one or two reference signal resources and an associated spatial filter. For example, when an SSB index is configured in a spatial relation, the terminal device may transmit a signal by using a spatial filter corresponding to the SSB index. The spatial filter corresponding to the SSB index may be a spatial filter used to receive, in the beam training process, an SSB identified by using the SSB index.

The terminal device may determine, based on an SRI field in DCI on a PDCCH, a transmit beam for sending a physical uplink shared channel (PUSCH).

It should be noted that, when a serving cell indicated in the spatial relation and a serving cell scheduled to transmit the uplink physical channel and/or the uplink signal to the terminal device are different serving cells, for example, the serving cell indicated in the spatial relation is a cell #0, and a configured pilot resource is a downlink physical channel and/or a downlink signal 0-0# or an uplink physical channel and/or an uplink signal 0-1# of the cell #0, while a serving cell scheduled to transmit the downlink physical channel and/or the downlink signal to the terminal device is a cell #1, the terminal device may alternatively determine the transmit beam of the uplink physical channel and/or the uplink signal or the receive beam of the downlink physical channel and/or the downlink signal of the cell #1 based on the spatial relation.

In a specific implementation, the terminal device may directly receive the downlink physical channel and/or the downlink signal of the cell #1 by using a downlink receive beam used to receive the downlink physical channel and/or the downlink signal 0-0# of the serving cell #0.

In a specific implementation, the terminal device may determine the receive beam of the downlink physical channel and/or the downlink signal of the cell #1 based on a direction of the downlink receive beam #0 used to receive the downlink physical channel and/or the downlink signal 0-0# of the serving cell #0. For example, a receive beam having a main lobe pointing angle same as the receive beam #0, a receive beam having a beam coverage with a width of 3 dB same as or similar to that of the receive beam #0, or an omnidirectional receive beam may be chosen to receive the downlink physical channel and/or the downlink signal of the cell #1.

In a specific implementation, the terminal device determines the receive beam of the downlink physical channel and/or the downlink signal of the cell #1 based on a direction of the transmit beam #0 used to send the uplink physical channel and/or the uplink signal 0-1# of the serving cell #0. For example, a receive beam having a main lobe pointing angle same as the transmit beam #0, a receive beam having a beam coverage with a width of 3 dB same as or similar to that of the transmit beam #0, or an omnidirectional receive beam may be chosen to receive the downlink physical channel and/or the downlink signal of the cell #1.

In a specific implementation, the terminal device may directly send the uplink physical channel and/or the uplink signal of the cell #1 by using a transmit beam used to receive the uplink physical channel and/or the uplink signal 0-1# of the serving cell #0.

In a specific implementation, the terminal device may determine the transmit beam of the uplink physical channel and/or the uplink signal of the cell #1 based on a direction of the downlink receive beam #0 used to receive the downlink physical channel and/or the downlink signal 0-0# of the serving cell #0. For example, a transmit beam having a main lobe pointing angle same as the receive beam #0, a transmit beam having a beam coverage with a width of 3 dB same as or similar to that of the receive beam #0, or an omnidirectional transmit beam may be chosen to send the downlink physical channel and/or the downlink signal of the cell #1.

In a specific implementation, the terminal device may determine the transmit beam of the uplink physical channel and/or the uplink signal of the cell #1 based on a direction of the receive beam #0 used to receive the downlink physical channel and/or the downlink signal 0-0# of the serving cell #0. For example, a transmit beam having a main lobe pointing angle same as the receive beam #0, a transmit beam having a beam coverage with a width of 3 dB same as or similar to that of the receive beam #0, or an omnidirectional transmit beam may be chosen to send the downlink physical channel and/or the downlink signal of the cell #1. This is not limited in this application.

10. Cell (cell): The cell is described by a higher layer from a perspective of resource management, mobility management, or a service unit. Coverage of each network device may be divided into one or more serving cells, and the serving cell may be considered to include a frequency domain resource. In the embodiments of this application, the cell may be replaced with a serving cell or a CC. In the embodiments of this application, terms "cell", "serving cell", and "CC" are used alternatively, and meanings expressed by the terms are consistent when differences between the terms are not emphasized. Similarly, terms "the serving cell index", "a serving cell identifier (ID)", "a cell identifier (cell ID)", and "a CC identifier (CC ID)" are used alternately, and when a difference between the terms is not emphasized, meanings to be expressed by the terms are consistent.

It should be noted that the cell may be an area within coverage of a wireless network of a network device. In the embodiments of this application, different cells may correspond to different network devices. For example, a network device in a cell #1 and a network device in a cell #2 may be different network devices such as base stations. That is, the cell #1 and the cell #2 may be managed by different base stations. In this case, in other words, the cell #1 and the cell #2 are co-sited or co-sited. The network device in the cell #1 and the network device in the cell #2 may alternatively be different radio frequency processing units, for example, radio remote units (RRU), of a same base station. In other words, the cell #1 and the cell #2 may be managed by a same base station that has a same baseband processing unit and a same intermediate frequency processing unit, but has different radio frequency processing units. This is not specifically limited in this application.

Cells can be classified into the following types:

Primary cell (PCell): The primary cell is an MCG cell that works on a primary frequency band, and is used by the UE to perform initial connection or reestablish a connection.

Secondary cell (Secondary Cell): A secondary cell is a cell, other than a special cell, that provides extra radio resources if UE is configured with a CA function.

Special cell (Special Cell): For a dual connectivity operation, the special cell is a primary cell of the MCG or a primary secondary cell of an SCG. Otherwise, the special cell is the primary cell.

Primary secondary cell (Primary SCG Cell): For the dual connectivity operation, the primary secondary cell is a cell that sends random access when the UE performs synchronous reconfiguration.

Secondary cell group (Secondary Cell Group): For UE configured with the dual connectivity, the secondary cell group is a subset of a serving cell that includes a PSCell and another secondary cell.

11. Carrier aggregation (CA): To efficiently use a fragmented spectrum, a system supports aggregation of different component carriers. A technology in which two or more carriers are aggregated to support a larger transmission bandwidth may be referred to as the carrier aggregation.

The carrier aggregation is specific to a terminal device. Different CCs may be configured for different terminal devices. Each CC may correspond to an independent cell. In the embodiments of this application, one CC may be equivalent to one cell. For example, a primary cell corresponds to a primary CC (or referred to as a primary carrier), and may be a cell that establishes an initial connection for the terminal, a cell that reestablishes an RRC connection, or a primary cell specified in a handover (handover) process. The secondary cell corresponds to a secondary CC (or referred to as a secondary carrier), and may be a cell that is added during RRC reconfiguration and that is used to provide an extra radio resource.

For a terminal device in a connected state, if the carrier aggregation is not configured, the terminal device has one serving cell; or if the carrier aggregation is configured, the terminal device may have a plurality of serving cells that may be referred to as a serving cell set. For example, the serving cell set of the terminal device includes the primary cell and the secondary cell. In other words, the serving cell set includes at least one primary cell and at least one secondary cell. In other words, the terminal configured with carrier aggregation may be connected to one primary cell and a plurality of secondary cells.

12. Cross-carrier scheduling (cross-carrier scheduling): The network device sends a physical downlink control channel (PDCCH) on one CC to schedule data transmission on another CC, that is, transmission of a PDSCH on the another CC, or transmission of a physical uplink shared channel (PUSCH) on the another CC. More specifically, the network device may send the PDCCH in a BWP on the CC, to schedule transmission of the PDSCH or the PUSCH in a BWP on the another CC. That is, a control channel is transmitted on a CC, and a corresponding data channel is transmitted on another CC.

Downlink control information (DCI) on the PDCCH may be used to indicate a scheduled CC by using a carrier indicator field (CIF). That is, the CIF may be used to specify a cell, where the PDCCH corresponds to a PDSCH/PUSCH resource in the cell.

13. Bandwidth part (BWP): In NR, different terminal devices in a same cell may have different transmitting or receiving capabilities. Therefore, a system may configure a corresponding bandwidth for each terminal device. The part of bandwidth configured for the terminal device is referred to as a BWP, and the terminal device performs transmission on the BWP of the terminal device. The BWP may be a group of contiguous frequency domain resources on a carrier. Different BWPs may occupy frequency domain resources that partially overlap, or may occupy frequency domain resources that do not overlap. The different BWPs may occupy frequency domain resources in a same bandwidth or different bandwidths. This is not limited in this application.

Different BWPs may be configured for the different terminal devices in the system. To support different services, different BWPs may support different numerologies (numerology). The numerology is a concept newly introduced into NR, and may be specifically understood as a set of parameters used in a communication system. For example, the numerology may include a subcarrier spacing (SCS), a symbol length, a cyclic prefix (CP) length, a quantity of resource blocks (RB), a slot length, a frame format, and the like. One cell may support one or more numerologies, and one BWP may support one numerology. It should be understood that specific content included in the numerology enumerated herein is merely an example for description, and shall not constitute any limitation on this application. For example, the numerology may further include a parameter of another granularity that can be supported in NR.

In conclusion, different transmission bandwidths (for example, different quantities of RBs included in the BWPs), different subcarrier spacings, different cyclic prefixes (CP), and the like may be configured for the different BWPs.

Before transmitting data to a terminal device, the network device may pre-schedule a physical resource for the terminal device. The network device may schedule a PDSCH or a PUSCH for the terminal device by using, for example, a PDCCH. If the network device configures the carrier aggregation for the terminal device, a CC on which the network device sends the PDCCH may be different from a CC on which the PDSCH or the PUSCH is transmitted. For example, the PDCCH is sent on a CC #0, and the PDSCH or the PUSCH is transmitted on a CC #1, which is the cross-carrier scheduling described above. Alternatively, a BWP used by the network device to send the PDCCH is different from a BWP used to transmit the PDSCH or the PUSCH. For example, the PDCCH is sent in a BWP #0 on a CC #0, and the PDSCH or the PUSCH is transmitted in a BWP #2 on the CC #0. Alternatively, both a CC and a BWP that are used by the network device to send the PDCCH are different from a CC and a BWP that are used to transmit the PDSCH or the PUSCH. For example, the PDCCH is sent in a BWP #0 on a CC #0, and the PDSCH or the PUSCH is transmitted in a BWP #1 on a CC #1.

Downlink transmission is used as an example. The network device configures an activated TCI state for the terminal device based on each BWP on each CC. For example, the network device sends the PDCCH in the BWP #0 on the CC #0, and transmits the PDSCH in the BWP #1 on the CC #1. In this case, the terminal device may pre-receive an activated TCI state configured for the BWP #0 on the CC #0 and an activated TCI state configured for the BWP #1 on the CC #1.

For example, activated TCI states configured for the BWP #0 on the CC #0 include TCI states 0 to 7, and activated TCI states configured for a BWP #2 on the CC #1 include a TCI state 0 and TCI states 4 to 6. In this case, mapping relationships in Table 1 and Table 2 may be obtained. Table 1 shows a mapping relationship configured for the BWP #0 on the CC #0. Details are as follows:

TABLE 1

| 3-bit TCI field in DCI | TCI state configured in RRC |
| --- | --- |
| 000 | TCI state 0 |
| 001 | TCI state 1 |
| 010 | TCI state 2 |
| 011 | TCI state 3 |
| 100 | TCI state 4 |
| 101 | TCI state 5 |
| 110 | TCI state 6 |
| 111 | TCI state 7 |

Table 2 shows a mapping relationship configured for the BWP #1 on the CC #1. Details are as follows:

TABLE 2

| 3-bit TCI field in DCI | TCI state configured in RRC |
| --- | --- |
| 000 | TCI state 0 |
| 001 | TCI state 4 |
| 010 | TCI state 5 |
| 011 | TCI state 6 |

It can be learned that when different mapping relationships are used, TCI states indicated by using a TCI field may be different. For example, when the TCI field is "010", the TCI field corresponds to the TCI state 3 in Table 1, and corresponds to the TCI state 5 in Table 2. It may be understood that the TCI state 3 and the TCI state 5 are obtained through training based on different transmit beams and/or receive beams, and both transmit beams and receive beams determined based on the TCI state 3 and the TCI state 5 may be different.

14. Carrier (CC): The carrier may alternatively be referred to as a component carrier or the like.

Carrier aggregation is mainly used to aggregate a plurality of carrier units (component carrier, CC, carrier, or the like) into a carrier having a relatively large bandwidth, and a downlink control channel (PDCCH) and a PDSCH are in a same CC or different CCs. A CC may include one or more BWPs. In the embodiments of this application, the cell may be replaced with a serving cell or a CC. In the embodiments of this application, terms "cell", "serving cell", and "CC" are used alternatively, and meanings expressed by the terms are consistent when differences between the terms are not emphasized. Similarly, "serving cell index", "serving cell identifier (ID)", "cell identifier (cell ID)", and "CC identifier (CC ID)" are alternately used, and meanings expressed by the terms are consistent when differences between the terms are not emphasized.

15. Beam management resource: The resource used for beam management, or may be embodied as a resource used for calculating and measuring beam quality. The beam quality includes layer 1 received reference signal power (L1-RSRP), layer 1 received reference signal quality (L1-RSRQ), and the like. Specifically, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

16. Beam quality: A measurement indicator for measuring the beam quality is not limited in this application, and possible indicators include reference signal received power (RSRP), a block error rate (BLER), reference signal received quality (RSRQ), a reference signal received strength indicator (RSSI), a signal to interference and noise ratio (SINR), a channel quality indicator (CQI), a correlation, and the like.

17. Antenna panel (panel): A signal in wireless communication needs to be received and sent through an antenna, and a plurality of antenna elements may be integrated on one panel (panel). One radio frequency chain may drive one or more antenna elements. In the embodiments of this application, the terminal device may include a plurality of antenna panels, and each antenna panel includes one or more beams. The network device may also include a plurality of antenna panels, and each antenna panel includes one or more beams. The antenna panel may alternatively be represented as an antenna array or an antenna subarray. One antenna panel may include one or more antenna arrays/subarrays. One antenna panel may be controlled by one or more oscillators. The radio frequency chain may also be referred to as a receive channel and/or a transmit channel, a receiver branch, or the like. One antenna panel may be driven by one radio frequency chain, or may be driven by a plurality of radio frequency chains. Therefore, the antenna panel in this application may alternatively be replaced with a radio frequency chain, a plurality of radio frequency chains that drive one antenna panel, or one or more radio frequency chains that are controlled by one oscillator.

As the first release of the 5G standard, Release 15 supports two frequency ranges: a frequency range 1 (low frequency, FR 1 for short, 450 MHz to 6000 MHz) and a frequency range 2 (high frequency, FR 2 for short, 24250 MHz-52600 MHz). The base station uses different radio frequency channels for the FR 1 frequency band and the FR 2 frequency band. An analog beam output by using a larger-scale high-frequency antenna array is narrower, while an analog beam output by using a smaller-scale low-frequency antenna array is wider.

In a high-frequency and low-frequency coordination scenario, the high frequency may be used only for data transmission offloading (offloading). When no data is transmitted at the high frequency, a high-frequency secondary cell may be deactivated, and a relatively long high-frequency inactive state measurement period is configured, to reduce power consumption of the terminal device.

When data transmission needs to be performed at the high frequency, the base station delivers activation signaling of a secondary cell by using MAC CE signaling. After receiving the activation signaling, the base station configures an SSB machine type communication (MT) configuration based on a radio resource RRC, and detects an SSB signal in a corresponding time detection window. FIG. 2 is a schematic diagram of a format of activation signaling of a MAC CE secondary cell in a current technology. As shown in the figure, an octet (Oct) in the figure represents a byte (byte) including eight bits (bits). R is a reserved bit. $C_i$ is activation indication information, and corresponds to a component carrier (CC) index in the RRC configuration. When a value of $C_i$ is 1, it indicates that a corresponding CC is activated; when a value of $C_i$ is 0, it indicates that a corresponding CC is deactivated, where i=0, 2, . . . 7.

Specifically, $C_i$ in the MAC CE is used to indicate whether each CC is activated. Each $C_i$ may occupy one bit. For example, the value of $C_i$ may be 1 or 0. The value 1 indicates that the CC is selected for activation, and the value 0 indicates that the CC is not selected for activation. Values of at most seven $C_i$ may be set to 1 (there are eight CCs, one of which is a primary CC, namely, a primary cell, and is always in an activated state).

For example, in FIG. 2, $C_1$ to $C_7$ are seven pieces of activation indication information, and successively correspond to seven component carriers CC 1 to CC 7. If a value of $C_1$ is 1, it indicates that CC 1 is activated; if a value of $C_1$ is 0, it indicates that CC 1 is deactivated; and if values of $C_1$ to $C_7$ are all 1, it indicates that CC 1 to CC 7 are activated.

FIG. 3 is a schematic diagram of another format of MAC CE in the current technology. FIG. 3 shows formats of activation signaling of a MAC CE secondary cell of four octets (Oct). A maximum of 32 pieces of activation indication information may be configured for the activation signaling of the MAC CE secondary cell, where CC 0 corresponding to $C_0$ is a primary cell, and CC 1 to CC 31 corresponding to $C_1$ to $C_{31}$ represent 31 secondary cells.

In an activation stage, the network device does not configure any quasi co-location indication information for the terminal device, and the terminal device needs to determine a receive beam to detect and receive an SSB signal, to implement uplink and downlink synchronization of the secondary cell, and complete secondary cell activation. When the terminal device is equipped with a plurality of high-frequency panels, and different panels may cover a plurality of different directions, during high-frequency secondary cell activation, receive beam scanning of the terminal device needs to be performed until a relatively good receive beam is found and an SSB signal is successfully detected and received, to complete activation of the secondary cell. The activation process takes a long period of time. According to an existing delay definition, a user needs a maximum of 25 SSB-based measurement timing configuration (SMTC) periodicities to complete cell discovery and receive beam scanning, which reduces communication quality and reliability.

In view of this, this application provides a secondary cell activation method, to reduce an activation delay of a secondary cell and improve communication quality and reliability when performing secondary cell activation.

The following describes the embodiments of this application in detail with reference to the accompanying drawings.

Figures 4, 5:
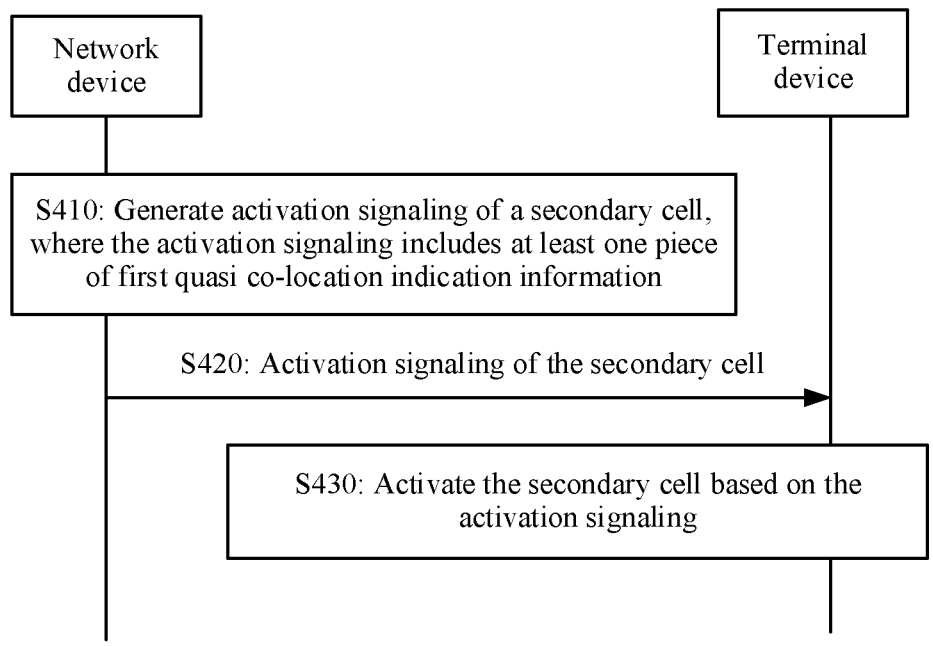

FIG. 4 is a schematic flowchart, shown from a perspective of device interaction, of a secondary cell activation method 400. As shown in FIG. 4, the method 400 shown in FIG. 4 may include step 410 to step 430. The following describes the steps in the method 400 in detail with reference to FIG. 4.

It should be understood that in this embodiment of this application, the method 400 is described by using an example in which the method 400 is performed by a terminal device and a network device. As an example instead of a limitation, the method 400 may alternatively be performed by a chip used in a terminal device and a chip used in a network device.

S410: The network device generates activation signaling of a secondary cell, where the activation signaling includes at least one piece of first quasi co-location indication information.

The first quasi co-location indication information is used to indicate beam information of the secondary cell. Optionally, the first quasi co-location indication information may be used to indicate, to the terminal device, a receive beam of a downlink physical channel and/or a downlink signal, and/or a transmit beam of an uplink physical channel and/or an uplink signal in an activation stage of the secondary cell. The terminal device receives a downlink physical channel and/or a downlink signal and/or sends an uplink physical channel and/or an uplink signal in the activation stage of the secondary cell by using the beam indicated by using the first quasi co-location indication information.

Optionally, the first quasi co-location indication information may be determined based on the following principle. In a line of sight (LOS) scenario, it may be considered that a high frequency channel and a low frequency channel have consistency. To be specific, after determining an optimal receiving direction of a low-frequency receive beam through channel measurement, the terminal device may perform beam scanning in the receiving direction, and detect and receive an SSB signal, to complete activation of the secondary cell, that is, low-frequency information is used to assist in activating a high-frequency secondary cell. After determining the optimal receiving direction, the network device may carry the first quasi co-location indication information used to indicate the receive beam in the optimal low-frequency receiving direction in activation signaling of the high-frequency secondary cell. An uplink case is similar to the downlink case. For brevity, details are not described again.

It should be noted that, a frequency range 1, namely, a low frequency, FR 1 for short, ranges from 450 MHz to 6000 MHz; a frequency range 2, namely, a high frequency, FR 2 for short, ranges from 24250 MHz to 52600 MHz.

Optionally, the first quasi co-location indication information may include a transmission configuration indicator state identifier (TCI state ID), a pilot resource set identifier (RS resource set ID), or spatial relation indication information. This is not limited in this embodiment of this application.

For example, the first quasi co-location indication information is the TCI state ID. FIG. 5 to FIG. 7 respectively show three formats of activation signaling of a MAC CE secondary cell that carries the first quasi co-location indication information. FIG. 5 shows a format of activation signaling of a MAC CE secondary cell of N Octs. Compared with the existing format of the activation signaling of the MAC CE secondary cell shown in FIG. 2, the format of the activation signaling of the MAC CE secondary cell shown in FIG. 5 carries at least one TCI state ID, for example, TCI state ID 0 or TCI state ID 1 in FIG. 5. Similarly, compared with the format in FIG. 3, the format of the activation signaling of the MAC CE secondary cell shown in FIG. 6 carries at least one TCI state ID. $C_i$ in a MAC CE is used to indicate whether each CC state is activated. Each $C_i$ may occupy one bit, and a value of the TCI state ID corresponds to an $i^{th}$ TCI state in the TCI state list configured by using tci-StatesToAddModList in the RRC message. The terminal device obtains, by querying the TCI state list, the TCI state corresponding to the value of the TCI State ID. In a beam training process, the terminal device may maintain a correspondence between each of a serving cell index, a BWP ID, and a reference signal resource identifier and a receive beam, and the network device may maintain a correspondence between each of the serving cell index, the BWP ID, and the reference signal resource identifier and a transmit beam. The terminal device may determine the receive beam based on a TCI state indicated by the network device, and the network device may determine the transmit beam based on the same TCI state.

Optionally, the activation signaling further includes indication information $C_i$ of a plurality of component carriers CCs, and the at least one TCI state ID has a specific correspondence with the plurality of CCs.

1. A plurality of TCI state IDs correspond one-to-one to the plurality of CCs.

The TCI state IDs sequentially correspond one-to-one to the CCs. In the format of the activation signaling of the MAC CE secondary cell shown in FIG. 5, it is configured, based on a number sequence, that CC 1 corresponds to the TCI state ID 0, CC 2 corresponds to the TCI state ID 1, . . . , and CC 7 corresponds to TCI state ID 6.

2. An activated CC corresponds to one TCI state ID.

In the activation signaling, if values of only indication information $C_1$ and $C_3$ are 1, which indicates that only CC 1 and CC 3 corresponding to $C_1$ and $C_3$ are activated, only TCI state ID 0 and TCI state ID 2 corresponding to CC 1 and CC 3 are configured.

3. All CCs correspond to one TCI state ID.

For example, in the activation signaling, TCI state ID 0 is configured for all the CCs. When TCI state information corresponding to the TCI state ID 0 exists in the TCI state list configured by using the RRC message, all the CCs are activated based on the TCI state information; when TCI configuration information corresponding to the TCI state ID 0 does not exist in RRC configuration signaling, for example, the TCI state ID 0 is −1 or another invalid value, the terminal device autonomously determines a receive beam.

4. A group of CCs correspond to one TCI state ID.

For example, in the activation signaling, if CC 1, CC 2, CC 3, and CC 4 respectively corresponding to activation indication information $C_1$, $C_2$, $C_3$, and $C_4$ are a group of CCs, TCI state ID 0 is configured for the group of CCs. For another example, if CCs respectively corresponding to activation indication information C1, C3, C5, and C7 are in one group of CCs, TCI state ID 1 is configured for the group of CCs, and TCI state ID 2, TCI state ID 3, and the like are sequentially configured for other groups of CCs.

The CC grouping manner may be that CCs having a same bandwidth are in one group, CCs having a same frequency band are in one group, CCs having a same receive beam are in one group, or CCs having a same transmit beam are in one group.

Specific grouping manners further include another grouping manner, which is explicitly configured for the terminal device or is implicitly notified to the terminal device by using the RRC message. This is not limited in this application.

It should be noted that the foregoing four correspondence relationships are merely examples. This is not limited in this application.

Optionally, a format of the activation signaling of the MAC CE secondary cell may alternatively be as shown in FIG. 7. Specifically, one bit is reserved in indication information of each CC, to configure a corresponding TCI state ID. If the indication information of the CC does not include the corresponding TCI state ID, it indicates that the terminal device determines a receive beam of the CC to detect and receive the SSB signal, to complete activation of the secondary cell. For example, when indication information of CC 1 includes corresponding TCI state ID 0, a receive beam is determined based on a TCI state corresponding to TCI state ID 0 in the TCI state list, and the SSB signal is detected and received by using the receive beam, to complete activation of the secondary cell.

It should be noted that, for ease of description, FIG. 5 to FIG. 7 show only three formats of the activation signaling of the MAC CE secondary cell in the embodiments of this application. This is not limited in this application.

S420: The network device sends the activation signaling of the secondary cell to the terminal device.

The network device sends the activation signaling including the first quasi co-location indication information to the terminal device. The activation signaling may be implemented by the network device by sending the MAC CE to the terminal device by using a primary cell.

Optionally, before the terminal device receives the activation signaling of the secondary cell generated by the network device, the terminal device receives first indication information sent by the network device, where the first indication information is used to indicate that downlink timing of the primary cell is the same as that of the secondary cell, or that a timing advance group TAG of the primary cell is the same as that of the secondary cell.

S430: The terminal device activates the secondary cell based on the activation signaling.

After receiving the activation signaling, the terminal device may determine an optimal receive beam based on the first quasi co-location indication information carried in the activation signaling, perform beam scanning in a direction of the optimal receive beam, and receive and detect the SSB signal, to complete activation of the secondary cell. A specific determining method of the terminal device is not limited in this embodiment of this application.

Optionally, when the first quasi co-location indication information is the TCI state ID, after receiving the activation signaling of the secondary cell, the terminal device determines a receive beam based on the TCI state ID carried in the activation signaling, and detects and receives the SSB by using the receive beam determined by using the TCI state corresponding to the TCI state ID, to complete activation of the secondary cell.

For example, if currently the primary cell is a low-frequency cell and the secondary cell is a high-frequency cell, "TCI-state->QCL-Info->referenceSignal" that is in a TCI state list and that corresponds to the TCI state ID carried in the activation signaling of the secondary cell may be a low-frequency SSB or RS resource, and the terminal device determines, based on a strongest receive direction of a low-frequency SSB or RS signal, that a high-frequency receive beam set includes one or more receive beams whose strongest receive directions of the low-frequency signals are the same or similar, and the terminal device detects and receives the SSB signal in the one or more receive beams, to implement activation of the secondary cell.

Optionally, the terminal device performs channel state information (CSI) measurement in the secondary cell based on a configuration of a base station, and reports a CSI measurement result to the network device, to notify the network device that the secondary cell is successfully activated, and data transmission may be performed. The configuration of the base station may be periodic CSI-RS reporting configured by using the RRC message, or may be semi-persistent CSI-RS reporting that is configured by using the RRC message and activated by the MAC-CE, or may be aperiodic CSI-RS reporting that is configured by using the RRC message, activated by the MAC-CE, and selected by the DCI.

Optionally, the terminal device receives a downlink physical channel and/or a downlink signal and/or sends an uplink physical channel and/or an uplink signal in the secondary cell by using a beam indicated by using the first quasi co-location indication information.

Optionally, after the secondary cell is activated, the terminal device may determine, according to an indication of the first quasi co-location indication information, a receive beam of a downlink channel and/or a downlink physical channel and/or a downlink signal, and/or a transmit beam of an uplink channel and/or an uplink physical channel and/or an uplink signal, to receive the downlink channel and/or the downlink physical channel and/or the downlink signal, and/or send the uplink channel and/or the uplink physical channel and/or the uplink signal, such as a downlink control channel and a downlink data channel. If quasi co-location information, for example, a PDCCH TCI, is preconfigured for the downlink control channel, the terminal device may ignore the configuration, and receive the downlink control channel based on the first quasi co-location indication information.

In addition, the network device may further send second quasi co-location indication information to the terminal device after the secondary cell is activated. The second quasi co-location indication information is used to indicate, to the terminal device, a receive beam of a downlink physical channel and/or a downlink signal, and/or a transmit beam of an uplink physical channel and/or an uplink signal after receiving the second quasi co-location indication information. The terminal device receives a downlink physical channel and/or a downlink signal, and/or sends an uplink physical channel and/or an uplink signal in the secondary cell by using a beam indicated by using the second quasi co-location indication information.

There may be a specific time interval between receiving the second quasi co-location indication information and using the second quasi co-location indication information by the terminal device, and a beam switching delay, an antenna panel switching delay, and/or an RF channel starting delay need to be considered. In this case, the second quasi co-location indication information is used after the time interval.

Optionally, the first quasi co-location indication information is further used to indicate, to the terminal device, a receive beam of a downlink physical channel and/or a downlink signal, and/or a transmit beam of an uplink physical channel and/or an uplink signal when receiving the second quasi co-location indication information after completing activation of the secondary cell. In other words, after the secondary cell is activated, when the second quasi co-location indication information is not received, the terminal device continues to determine the receive beam and/or the transmit beam by using the first quasi co-location indication information.

In the secondary cell activation method provided in this application, the network device carries the at least one piece of first quasi co-location indication information in the activation signaling of the secondary cell, and the terminal device completes activation of the secondary cell based on the first quasi co-location indication information, thereby reducing the activation delay of the secondary cell and improving a system capacity and user service experience, without increasing power consumption of the terminal device.

In the current technology, initial access of a terminal device is mainly performed by detecting and receiving an SSB signal. To reduce overheads of the terminal device, an SSB signal periodicity is usually set to be relatively long. During beam scanning, if a periodicity is not over, a next time of beam scanning can be performed only when the second period starts. As a result, beam scanning takes excessively long time. Therefore, during activation of the secondary cell, another reference signal may be detected and received instead of detecting and receiving the SSB signal with a relatively long detection periodicity, to complete activation of the secondary cell, thereby reducing the activation delay of the secondary cell, reducing detection power consumption of the terminal device, and improving communication quality and reliability.

Figure 8:
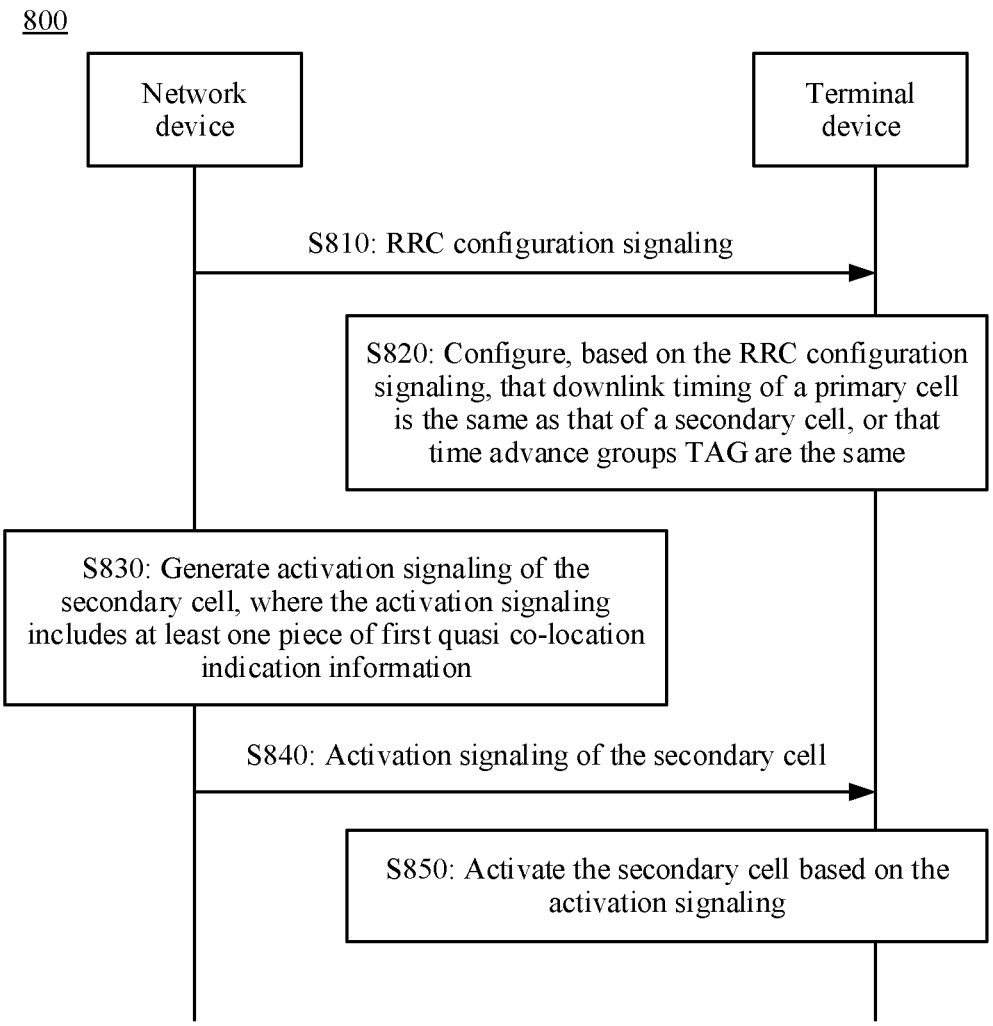
FIG. 8 is a schematic flowchart of a secondary cell activation method according to another embodiment of this application.

In another embodiment, the first quasi co-location indication information may be a pilot resource set identifier. FIG. 8 is a schematic flowchart, shown from a perspective of device interaction, of a secondary cell activation method 800. As shown in FIG. 8, the method 800 shown in FIG. 8 may include step 810 to step 850. The following describes the steps in the method 800 in detail with reference to FIG. 8.

It should be understood that in this embodiment of this application, the method 800 is described by using an example in which the method 800 is performed by a terminal device and a network device. As an example instead of a limitation, the method 800 may alternatively be performed by a chip used in a terminal device and a chip used in a network device.

S810: The terminal device receives first indication information sent by the network device.

The first indication information is used to indicate the terminal device to configure that downlink timing of a primary cell is the same as that of a secondary cell, or that timing advance groups (TAG) are the same.

S820: The terminal device configures, based on the first indication information, that the downlink timing of the primary cell is the same as that of the secondary cell, or that the TAGs are the same.

Downlink timing synchronization is implemented by configuring that the downlink timing of the primary cell is the same as that of the secondary cell, or that the TAGs are the same.

S830: The network device generates activation signaling of the secondary cell, where the activation signaling includes at least one piece of first quasi co-location indication information.

Specifically, in this embodiment of this application, the first quasi co-location indication information may be a pilot resource set identifier (RS resource set ID), and an RS may be a zero power (ZP) CSI-RS, an NZP CSI-RS, a tracking reference signal TRS, a downlink control channel demodulation reference signal (DMRS), or an uplink sounding reference signal (SRS). This is not limited in this application.

Optionally, the at least one piece of first quasi co-location indication information is used to indicate, to the terminal device, a receive beam of a downlink physical channel and/or a downlink signal, and/or a transmit beam of an uplink physical channel and/or an uplink signal in an activation stage of the secondary cell.

S840: The network device sends the activation signaling of the secondary cell to the terminal device.

The activation signaling may be sent to the terminal device by the network device by using a MAC CE. FIG. 9 to FIG. 11 are formats of activation signaling of a MAC CE secondary cell according to an embodiment of this application. A difference between FIG. 9 to FIG. 11 and FIG. 5 to FIG. 7 lies in that in this embodiment of this application, the first quasi co-location indication information carried in the activation signaling is an RS resource set ID. For related descriptions, refer to the foregoing embodiments. For brevity, details are not described herein again.

There is also a correspondence between the at least one RS resource set ID and the plurality of CCs included in the activation signaling. The correspondence is consistent with the correspondence between the TCI state ID and the plurality of CCs. For brevity, details are not described herein again.

It should be noted that a reference signal associated with the RS resource set ID may be an SSB or RS (NZP CSI-RS, ZP CSI-RS, TRS, DMRS, SRS) resource. To accelerate activation of the secondary cell, the reference signal may be sent periodically, in a triggered manner, or semi-persistently. A specific sending manner is not limited in this embodiment of this application, provided that fast beam scanning can be implemented.

In addition, after sending the activation signaling of the secondary cell to the terminal device, the network device may explicitly or implicitly deactivate a reference signal resource indicated by using the RS resource set ID. In the explicit manner, the network device sends deactivation signaling to the terminal device to indicate the terminal device to deactivate based on the reference signal resource.

A specific implicit method is to determine by using other signaling or by determining whether a predefined condition is met. Descriptions are provided below by using examples:

Method 1: It is agreed in a protocol in advance that, after sending the activation signaling of the secondary cell to the terminal device, the network device activates sending of the reference signal resource after receiving, for the first time, CSI measurement reporting for activating the secondary cell.

Method 2: It is agreed in a protocol in advance that, the reference signal resource indicated by using the activation signaling of the secondary cell is sent only in a specific time period. For example, the reference signal resource is sent in a period from a time when the network device starts to send the activation signaling to the terminal device to a time when a maximum activation delay defined in the protocol ends.

Method 3: The reference signal resource indicated by using the activation signaling of the secondary cell is sent only once. For example, the reference signal resource is sent once in an $(n+k)^{th}$ ($k>=0$) slot in which the network device sends the activation signaling to the terminal device.

It should be understood that the implicit sending method of the deactivation reference signal resource is merely an example. This is not limited in this application.

S850: The terminal device activates the secondary cell based on the activation signaling.

After the low frequency channel determines the optimal receive beam based on the reference signal, it is indicated that an RS resource ID corresponding to the optimal receive beam set is carried in the activation signaling of the secondary cell as the first quasi co-location indication information, and the network device sends the activation signaling to the terminal device.

After receiving the activation signaling, the terminal device determines a corresponding RS resource set based on the RS resource set ID, and the terminal device detects and receives a reference signal based on the RS resource set, to complete activation of the secondary cell.

For example, after receiving the activation signaling of the secondary cell, the terminal device detects and receives a corresponding reference signal at a time-frequency domain resource location indicated by using the RS resource set ID, to complete activation of the secondary cell.

The network device sends the downlink reference signal based on the activation signaling and configuration information in the first indication information, and the terminal device sends the uplink reference signal based on the configuration information.

Optionally, the terminal device receives a downlink physical channel and/or a downlink signal and/or sends an uplink physical channel and/or an uplink signal in the secondary cell by using a beam indicated by using the first quasi co-location indication information.

Optionally, after the secondary cell is activated, the terminal device may determine, according to an indication of the first quasi co-location indication information, a receive beam of a downlink channel and/or a downlink physical channel and/or a downlink signal, and/or a transmit beam of an uplink channel and/or an uplink physical channel and/or an uplink signal, to receive the downlink channel and/or the downlink physical channel and/or the downlink signal, and/or send the uplink channel and/or the uplink physical channel and/or the uplink signal, such as a downlink control channel and a downlink data channel. If quasi co-location information, for example, a PDCCH TCI, is preconfigured for the downlink control channel, the terminal may ignore the configuration, and receive the downlink control channel based on the first quasi co-location indication information.

In addition, the network device may further send second quasi co-location indication information to the terminal device after the secondary cell is activated. The second quasi co-location indication information is used to indicate, to the terminal device, a receive beam of a downlink physical channel and/or a downlink signal, and/or a transmit beam of an uplink physical channel and/or an uplink signal after receiving the second beam indication information. The terminal device receives a downlink physical channel and/or a downlink signal and/or sends an uplink physical channel and/or an uplink signal in the secondary cell by using a beam indicated by using the second quasi co-location indication information.

According to the secondary cell activation method provided in this embodiment of this application, detection and reception of another reference signal is used to replace detection and reception of an SSB signal with a relatively long receiving periodicity. The reference signal is continuously sent, so that receive beam scanning can be completed within a relatively short time, thereby reducing the activation delay of the secondary cell, and improving a system capacity and user experience.

In the current technology, during activation of the secondary cell, the network device does not configure any quasi co-location indication information for the terminal device, so that during activation of the secondary cell, the terminal device can only perform blind detection and determine the optimal receive beam, to detect and receive the SSB signal, and implement activation of the secondary cell. As a result, the activation delay of the secondary cell is excessive long. In a high and low frequency co-site scenario, a primary cell is usually a low-frequency cell, and the primary cell can only be in an activated state and cannot be deactivated. Therefore, when high frequency downlink timing and low frequency downlink timing are the same or TAGs are the same, when a high-frequency secondary cell is activated, a high-frequency SSB may be used as reference for a low-frequency reference signal, and low-frequency measurement may be used to assist in activating high-frequency secondary cell.

Figure 12:
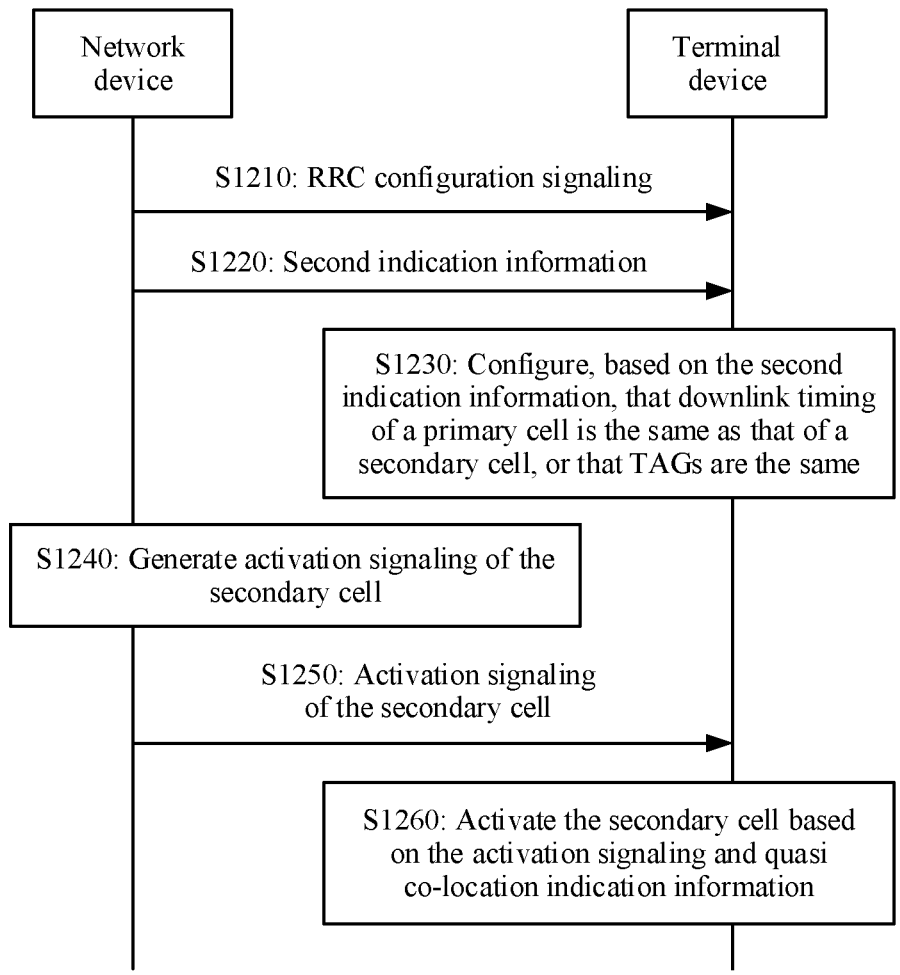
FIG. 12 is a schematic flowchart of a secondary cell activation method according to still another embodiment of this application.

FIG. 12 is a schematic flowchart, shown from a perspective of device interaction, of a secondary cell activation method 1200. As shown in FIG. 12, the method 1200 shown in FIG. 12 may include step 1210 to step 1260. The following describes the steps in the method 1200 in detail with reference to FIG. 12.

It should be understood that in this embodiment of this application, the method 1200 is described by using an example in which the method 1200 is performed by a terminal device and a network device. As an example instead of a limitation, the method 1200 may alternatively be performed by a chip used in a terminal device and a chip used in a network device.

S1210: The terminal device receives RRC configuration signaling sent by the network device.

The RRC configuration signaling includes synchronization signal/physical broadcast channel block (SSB) resource information and quasi co-location (QCL) indication information of an SSB resource.

After receiving the RRC configuration signaling, the terminal device receives an SSB of a secondary cell based on the quasi co-location indication information indicated by using the RRC configuration signaling.

For example, before the terminal device receives activation signaling, the network device configures channel quality indicator (CQI) information corresponding to the SSB for the terminal device by using "CSI-MeasConfig->csi-SSB-ResourceSetToAddModList->CSI-SSB-ResourceSet".

In addition, the network device defines a QCL indication of the SSB by using TCI-StateId, where "TCI-state->QCL-Info->referenceSignal" indicated by using the TCI-StateId may be an SSB or RS (NZP CSI-RS, ZP CSI-RS, TRS, DMRS, SRS) signal of a low-frequency cell, or may be an SSB or RS (NZP CSI-RS, ZP CSI-RS, TRS, DMRS, SRS) signal of a high-frequency cell. The specific signaling is as follows:

```
CSI-SSB-ResourceSet ::=        SEQUENCE {
    csi-SSB-ResourceSetId          CSI-SSB-ResourceSetId,
```

| | |
|---|---|
| csi-SSB-ResourceList (SIZE(1..maxNrofCSI-SSB-ResourcePerSet)) | SEQUENCE OF SSB-Index, |
| qcl-info | TCI-StateId (defining the QCL indication of the SSB) |
| ... | |

Optionally, the terminal device receives second indication information, where the second indication information is used to indicate the terminal device to configure that downlink timing of a primary cell is the same as that of the secondary cell, or that a timing advance group (TAG) of a primary cell is the same as that of the secondary cell.

S1220: The network device sends the second indication information.

The terminal device receives the second indication information, where the second indication information is used to indicate that downlink timing of the primary cell is the same as that of the secondary cell, and/or that a timing advance group (TAG) of the primary cell is the same as that of the secondary cell.

S1230: The terminal device configures, based on the second indication information, that the downlink timing of the primary cell is the same as that of the secondary cell, or that the TAGs are the same. This step is optional.

The terminal device configures, based on the second indication information, that the downlink timing of the primary cell is the same as that of the secondary cell, or that the TAGs are the same, to implement that high frequency downlink timing and low frequency downlink timing are the same.

S1240: The network device generates activation signaling of the secondary cell.

A format of the activation signaling may be the same as an existing format of activation signaling of the secondary cell. For details, refer to FIG. 2 and FIG. 3. For brevity, details are not described herein again.

S1250: The network device sends the activation signaling of the secondary cell to the terminal device.

The activation signaling may be sent to the terminal device by using a MAC CE.

S1260: The terminal device activates the secondary cell based on the activation signaling and the quasi co-location indication information.

The SSB is periodic and has a time offset. Therefore, after low frequency timing is obtained, the terminal device may know of symbols on which the SSB may be sent. The terminal device may determine a receive beam, and detect and receive the SSB signal when the SSB is sent, to implement activation of the secondary cell.

For example, because the RRC configuration signaling is used to configure that high and low frequency TAGs are the same, it may be determined, based on the SSB periodicity and the current low frequency timing, that the SSB occurs in the first symbol to the fourth symbol. Therefore, the terminal device may receive and detect, in the first symbol to the fourth symbol, the SSB signal by using the receive beam, to complete activation of the secondary cell.

In this embodiment of this application, in the high and low frequency co-sited scenario, before the secondary cell is activated, TAGs of a high frequency cell and a low frequency cell are configured to be the same by using RRC configuration signaling, to implement that downlink timing is the same. A low frequency channel reference signal is used as a QCL reference for the SSB, measurement based on a low frequency channel is performed to assist the terminal device in determining a receive beam of a high frequency SSB, and the SSB signal is detected and received, to implement activation of the secondary cell.

It should be understood that, in the embodiments of this application, "first", "second", and the like are merely intended to indicate that a plurality of objects are different. For example, the first quasi co-location indication information and the second quasi co-location indication information are merely used to distinguish different quasi co-location indication information. The quasi co-location indication information itself should not be affected. The "first", "second", and the like should not impose any limitation on this embodiment of this application.

It should be further understood that the foregoing descriptions are merely intended to help a person skilled in the art better understand the embodiments of this application, but are not intended to limit the scope of the embodiments of this application. It will be apparent to a person skilled in the art that various equivalent modifications or variations can be made based on the examples given above. Alternatively, any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein again.

It should be further understood that sequence numbers of the foregoing processes do not mean execution sequences. The execution sequences of the processes should be determined based on functions and internal logic of the processes, and should not constitute any limitation on implementation processes of the embodiments of this application.

It should be further understood that in the embodiments of this application, "presetting" and "predefinition" may be implemented by pre-storing, in a device (including, for example, the terminal device and the network device), corresponding code, a corresponding table, or another manner that can be used to indicate related information. A specific implementation is not limited in this application.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail an example of the secondary cell activation method provided in this application. It may be understood that, to implement the foregoing functions, the terminal device and the network device each include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The following describes a communication apparatus according to this application.

Figure 13:
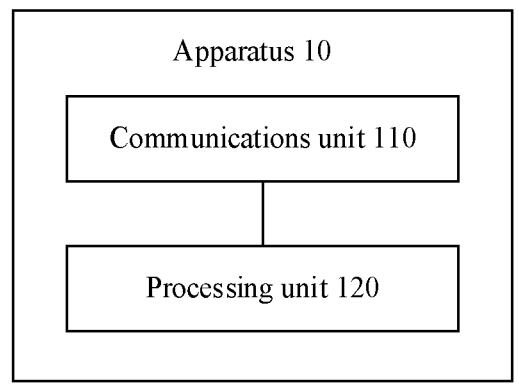
FIG. 13 is a schematic structural diagram of a communication apparatus according to an embodiment of this application.

FIG. 13 is a schematic diagram of a communication apparatus 10 according to this application. As shown in FIG. 13, the communication apparatus 10 includes a communication unit 110 and a processing unit 120.

In some possible implementations, the communication apparatus 10 may be a terminal device corresponding to the method 400 or 800.

The communication unit 110 is configured to receive activation signaling of a secondary cell sent by a network device, where the activation signaling includes at least one piece of first quasi co-location indication information.

The processing unit 120 is configured to activate the secondary cell based on the activation signaling.

The communication apparatus 10 completely corresponds to the terminal device in the method embodiment, and a corresponding unit of the communication apparatus 10 is configured to perform corresponding steps performed by the terminal device in the method embodiments shown in FIG. 4 to FIG. 12.

In some possible implementations, the communication apparatus 10 may be a terminal device corresponding to the method 1200.

The communication unit 110 is configured to receive radio resource control (RRC) configuration signaling, where the RRC configuration signaling includes synchronization signal/physical broadcast channel block (SSB) resource information and quasi co-location indication information of an SSB resource.

The processing unit 120 is configured to activate a secondary cell based on the quasi co-location indication information.

The communication apparatus 10 completely corresponds to the terminal device in the method embodiment, and a corresponding unit of the communication apparatus 10 is configured to perform corresponding steps performed by the terminal device in the method embodiments shown in FIG. 12.

Optionally, the communication unit 110 may be a receiver, and the processing unit 120 may be a processor.

Figure 14:
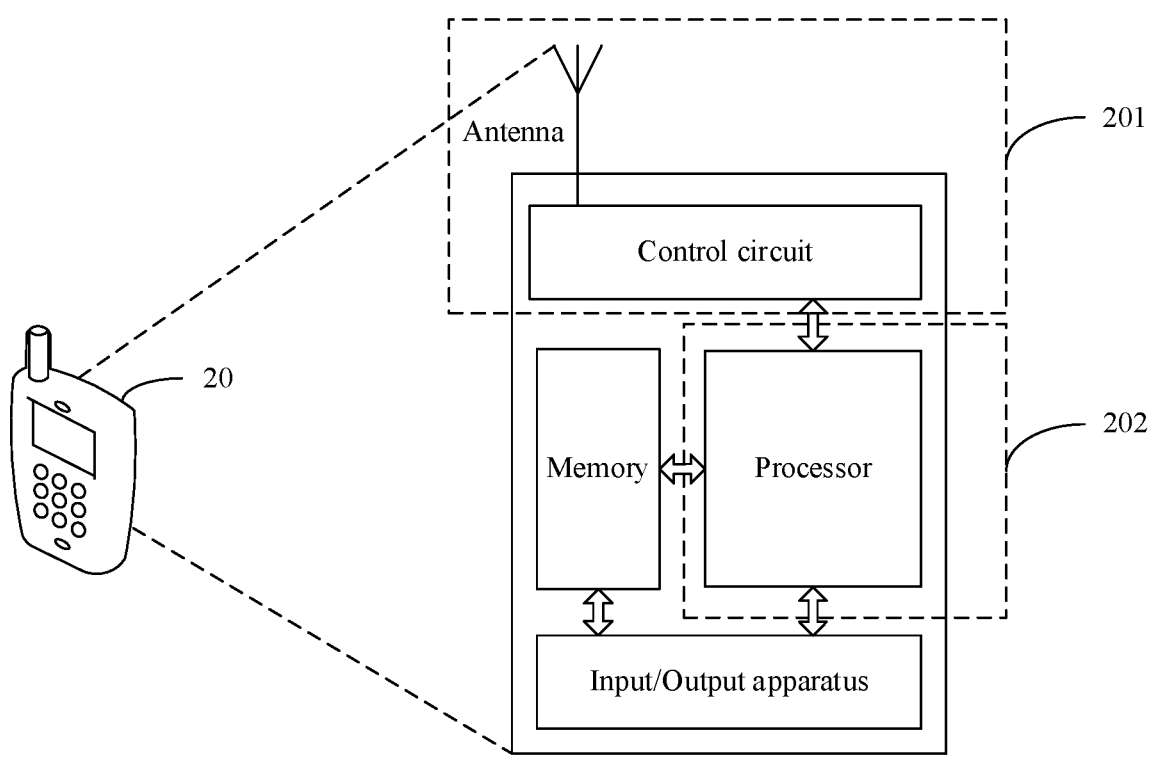
FIG. 14 is a schematic structural diagram of a terminal device applicable to an embodiment of this application.

FIG. 14 is a schematic structural diagram of a terminal device 20 applicable to an embodiment of this application. The terminal device 20 may be applied to the system shown in FIG. 1. For ease of description, FIG. 14 shows only main components of the terminal device. As shown in FIG. 14, the terminal device 20 includes a processor, a memory, a control circuit, an antenna, and an input/output apparatus. The processor is configured to control the antenna and the input/output apparatus to send or receive a signal. The memory is configured to store a computer program. The processor is configured to invoke the computer program from the memory and run the computer program, to perform a corresponding procedure and/or operation performed by the terminal device in the communication method provided in this application. Details are not described herein again.

A person skilled in the art may understand that for ease of description, FIG. 14 shows only one memory and one processor. An actual terminal device may have a plurality of processors and a plurality of memories. The memory may also be referred to as a storage medium, a storage device, or the like. This is not limited in the embodiments of this application.

Figure 15:
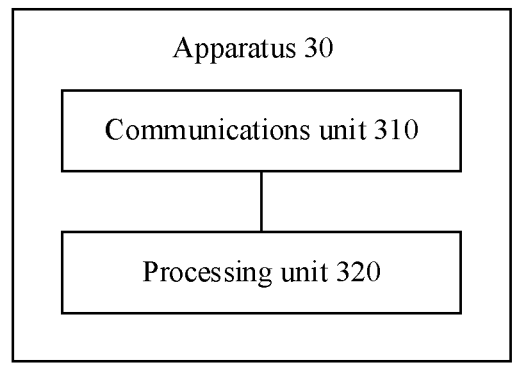
FIG. 15 is a schematic structural diagram of another communication apparatus according to an embodiment of this application.

FIG. 15 is a schematic diagram of a communication apparatus 30 according to this application. As shown in FIG. 15, the apparatus 30 includes a processing unit 320 and a communication unit 310.

In some possible implementations, the communication apparatus 30 may be a network device corresponding to the method 400 or 800.

The processing unit 320 is configured to generate activation signaling of a secondary cell, where the activation signaling includes at least one piece of first quasi co-location indication information.

The communication unit 310 is configured to send the activation signaling.

The apparatus 30 completely corresponds to the network device in the method embodiment, and a corresponding unit of the apparatus 30 is configured to perform corresponding steps performed by the network device in the method embodiments shown in FIG. 4 to FIG. 12.

In some possible implementations, the communication apparatus 30 may be a network device corresponding to the method 1200.

The processing unit 320 is configured to receive radio resource control (RRC) configuration signaling, where the RRC configuration signaling includes synchronization signal/physical broadcast channel block (SSB) resource information and quasi co-location indication information of an SSB resource.

The communication unit 310 is configured to send the RRC configuration signaling.

The apparatus 30 completely corresponds to the network device in the method embodiment, and a corresponding unit of the apparatus 30 is configured to perform corresponding steps performed by the network device in the method embodiments shown in FIG. 12.

Figure 16:
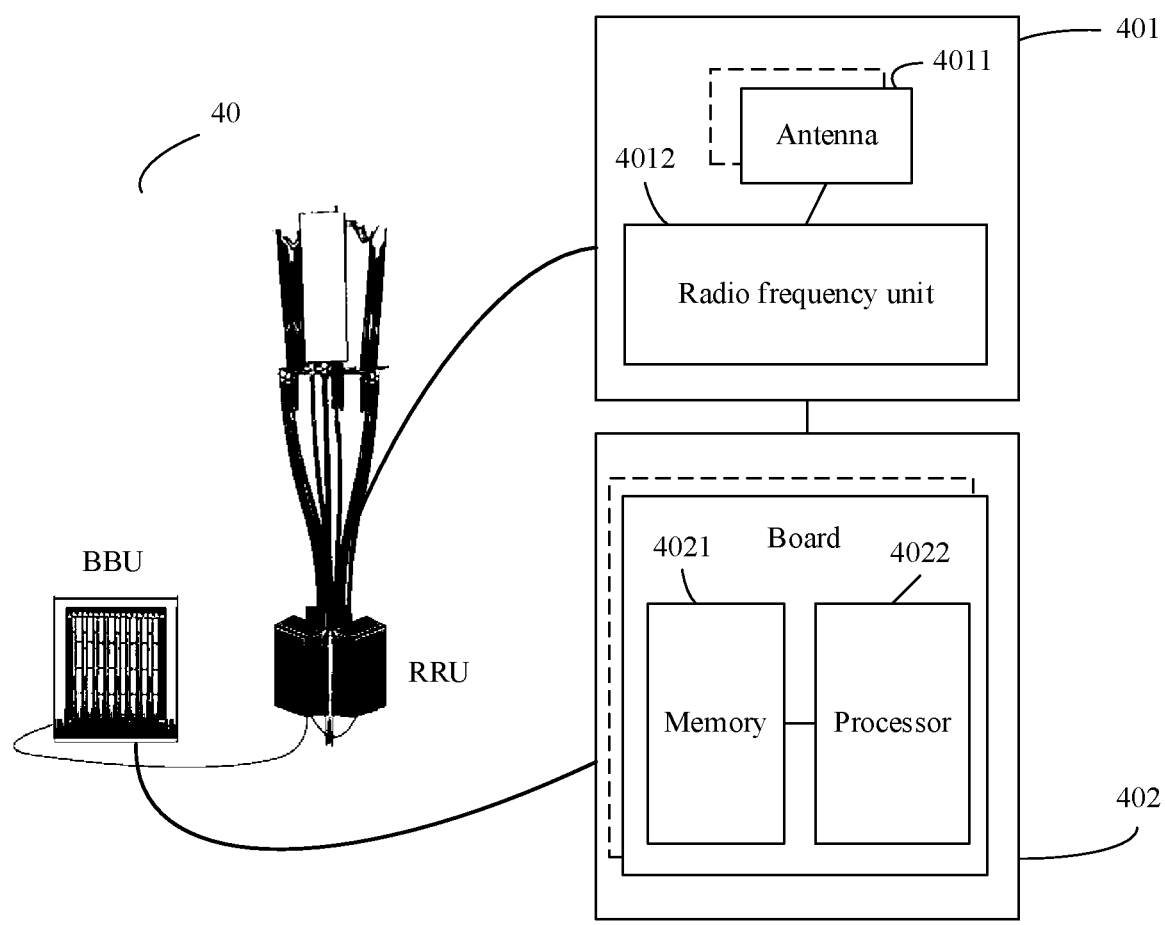
FIG. 16 is a schematic structural diagram of a network device applicable to an embodiment of this application.

FIG. 16 is a schematic structural diagram of a network device 40 applicable to an embodiment of this application, and can be used to implement functions of the network device in the foregoing communication method. For example, FIG. 16 may be a schematic structural diagram of a base station. As shown in FIG. 16, the network device may be applied to the system shown in FIG. 1.

The network device 40 may include one or more radio frequency units, for example, a remote radio unit (RRU) 401 and one or more baseband units (BBU). The baseband unit may also be referred to as a digital unit (DU) 402. The RRU 401 may be referred to as a transceiver unit, and is corresponding to the communication unit 310 in FIG. 15. Optionally, the transceiver unit 401 may also be referred to as a transceiver machine, a transceiver circuit, a transceiver, or the like, and may include at least one antenna 4011 and a radio frequency unit 4012. Optionally, the transceiver unit 401 may include a communication unit 1 and a communication unit 2. The communication unit 1 may correspond to a receiver (or referred to as a receiver or a receiving circuit), and the communication unit 2 may correspond to a transmitter (or referred to as a transmitter or a transmitting circuit). The RRU 401 is mainly configured to: send and receive a radio frequency signal, and perform conversion between a radio frequency signal and a baseband signal, for example, configured to send the control information in the foregoing embodiments to a terminal device. The BBU 402 is mainly configured to: perform baseband processing, control a base station, and so on. The RRU 401 and the BBU 402 may be physically disposed together, or may be physically separate, to be specific, in a distributed base station.

The BBU 402 is a control center of the network device, and may also be referred to as a processing unit. The BBU 402 may correspond to the processing unit 320 in FIG. 15, and is mainly configured to implement a baseband processing function such as channel encoding, multiplexing, modulation, and spreading. For example, the BBU (processing unit) 402 may be configured to control the network device 40 to perform an operation procedure related to the network device in the foregoing method embodiments, for example, determine a length of a symbol that carries control information of the terminal device.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook and the like in the foregoing embodiments. The processor 4022 is configured to control the base station to perform a necessary action, for example, control the base station to perform the operation procedure related to the network device in the foregoing method embodiments. The memory 4021 and the processor 4022 may serve the one or more boards. In other words, a memory and a processor may be independently disposed on each board, or a plurality of boards may share a same memory and a same processor. In addition, a necessary circuit may be further disposed on each board.

It should be understood that the network device 40 shown in FIG. 16 can implement functions of the network device in the method embodiments in FIG. 4 to FIG. 12. Operations and/or functions of units in the network device 40 are respectively used to implement corresponding procedures performed by the network device in the method embodiments of this application. To avoid repetition, detailed descriptions are appropriately omitted herein. The structure of the network device shown in FIG. 16 is merely a possible form, and should not constitute any limitation on the embodiments of this application. According to this application, there may be a network device structure in another form in the future.

An embodiment of this application further provides a communication system, including the foregoing network device and one or more terminal devices.

This application further provides a computer-readable storage medium. The computer-readable storage medium stores instructions. When the instructions are run on a computer, the computer is enabled to perform the steps performed by the network device in the methods shown in FIG. 4 to FIG. 12.

This application further provides a computer-readable storage medium. The computer-readable storage medium stores instructions. When the instructions are run on a computer, the computer is enabled to perform the steps performed by the terminal device in the methods shown in FIG. 4 to FIG. 12.

This application further provides a computer program product including instructions. When the computer program product is run on a computer, the computer is enabled to perform the steps performed by the network device in the methods shown in FIG. 4 to FIG. 12.

This application further provides a computer program product including instructions. When the computer program product is run on a computer, the computer is enabled to perform the steps performed by the terminal device in the methods shown in FIG. 4 to FIG. 12.

This application further provides a chip, including a processor. The processor is configured to read and run a computer program stored in a memory, to perform a corresponding operation and/or procedure performed by the terminal device in the communication method provided in this application. Optionally, the chip further includes the memory. The memory is connected to the processor through a circuit or a cable. The processor is configured to read and execute the computer program in the memory. Further, optionally, the chip further includes a communication interface. The processor is connected to the communication interface. The communication interface is configured to receive data and/or information that needs to be processed. The processor obtains the data and/or information from the communication interface, and processes the data and/or information. The communication interface may be an input/output interface.

This application further provides a chip, including a processor. The processor is configured to invoke and run a computer program stored in a memory, to perform a corresponding operation and/or procedure performed by the network device in the communication method provided in this application. Optionally, the chip further includes the memory. The memory is connected to the processor through a circuit or a cable. The processor is configured to read and execute the computer program in the memory. Further, optionally, the chip further includes a communication interface. The processor is connected to the communication interface. The communication interface is configured to receive data and/or information that needs to be processed. The processor obtains the data and/or information from the communication interface, and processes the data and/or information. The communication interface may be an input/output interface.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, and a digital-to-analog converter. The processor may allocate control and signal processing functions of a terminal device or a network device between these devices based on respective functions of these devices. In addition, the processor may have a function of operating one or more software programs. The software programs may be stored in the memory. The function of the processor may be implemented by hardware, or may be implemented by hardware by executing corresponding software. The hardware or software includes one or more modules corresponding to the function.

The memory may be a read-only memory (ROM), another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in an instruction or data structure form and that can be accessed by a computer.

Optionally, the memory and the processor in the foregoing embodiments may be physically independent units, or the memory may be integrated into the processor.

In the embodiments of this application, "at least one" means one or more, and "a plurality of" means two or more than two. The term "and/or" describes an association relationship for describing associated objects and represents that three relationships may exist. For example, A and/or B may represent: Only A exists, both A and B exist, and only B exists. A and B may be singular or plural. The character "/" generally indicates an "or" relationship between the associated objects. "At least one of the following" or a similar expression thereof indicates any combination of the following, including any combination of one or more of the following. For example, at least one of a, b, and c may indicate a, b, c, a-b, a-c, b-c, or a-b-c, where a, b, and c may be singular or plural.

A person of ordinary skill in the art may be aware that units, algorithms, and steps described in the embodiments disclosed in this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may not be physically separate, and parts displayed as units may not be physical units. That is, the units may be located in one position, or may be distributed on a plurality of network units. Some or all of the units may be selected based on an actual requirement to achieve the objectives of the technical solutions of this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A secondary cell activation method, comprising:
   receiving, by a terminal device, activation signaling of a secondary cell sent by a network device, wherein the activation signaling comprises at least one piece of first quasi co-location indication information; and activating, by the terminal device, the secondary cell based on the activation signaling;
   wherein when the at least one of first quasi co-location indication information comprises a transmission configuration indicator (TCI) state identifier (ID), after receiving the activation signaling of the secondary cell, the terminal device determines a receive beam based on the TCI state ID carried in the activation signaling, and detects and receives a synchronization signal/physical broadcast channel block (SSB) by using the receive beam determined by using a TCI state corresponding to the TCI state ID, to complete activation of the secondary cell.

2. The method according to claim 1, wherein the at least one piece of first quasi co-location indication information comprises the TCI state ID, a pilot resource set identifier, or spatial relation indication information.

3. The method according to claim 1, further comprising:
   receiving, by the terminal device, a downlink physical channel or a downlink signal; and
   sending an uplink physical channel or an uplink signal in the secondary cell by using a beam indicated by the at least one piece of first quasi co-location indication information.

4. The method according to claim 1, wherein the method further comprises:
   receiving, by the terminal device, second quasi co-location indication information sent by the network device; and
   receiving, by the terminal device, a downlink physical channel or a downlink signal and sending an uplink physical channel or an uplink signal in the secondary cell by using a beam indicated in the second quasi co-location indication information.

5. The method according to claim 1, wherein the activation signaling further comprises indication information of a plurality of component carriers, and each of the at least one piece of first quasi co-location indication information corresponds to one component carrier or one group of component carriers in the plurality of component carriers.

6. The method according to claim 1, wherein the method further comprises:

receiving, by the terminal device, first indication information sent by the network device, wherein the first indication information is used to indicate that downlink timing of a primary cell is the same as that of the secondary cell, or that a timing advance group (TAG) of a primary cell is the same as that of the secondary cell.

7. A secondary cell activation method, comprising:
generating, by a network device, activation signaling of a secondary cell, wherein the activation signaling comprises at least one piece of first quasi co-location indication information; and
sending, by the network device, the activation signaling;
wherein when the first quasi co-location indication information comprises a transmission configuration indicator (TCI) state identifier (ID), after receiving the activation signaling of the secondary cell, the terminal device determines a receive beam based on the TCI state ID carried in the activation signaling, and detects and receives a synchronization signal/physical broadcast channel block (SSB) by using the receive beam determined by using a TCI state corresponding to the TCI state ID, to complete activation of the secondary cell.

8. The method according to claim 7, wherein the at least one piece of first quasi co-location indication information comprises the TCI state ID, a pilot resource set identifier, or spatial relation indication information.

9. The method according to claim 7, further comprising:
sending, by the network device, a downlink physical channel or a downlink signal.

10. The method according to claim 7, wherein the method further comprises:
sending, by the network device, second quasi co-location indication information, wherein the second quasi co-location indication information is used to indicate to the terminal device to receive a downlink physical channel or a downlink signal and send an uplink physical channel or an uplink signal in the secondary cell by using a beam indicated by the second quasi co-location indication information.

11. The method according to claim 7, wherein the activation signaling further comprises indication information of a plurality of component carriers, and each of the at least one piece of first quasi co-location indication information corresponds to one component carrier or one group of component carriers in the plurality of component carriers.

12. The method according to claim 7, wherein the method further comprises:
sending, by the network device, first indication information, wherein the first indication information is used to indicate that downlink timing of a primary cell is the same as that of the secondary cell, or that a timing advance group (TAG) of a primary cell is the same as that of the secondary cell.

13. A communication apparatus, comprising:
a receiver, configured to receive activation signaling of a secondary cell sent by a network device, wherein the activation signaling comprises at least one piece of first quasi co-location indication information and wherein the first quasi co-location indication information indicates a spatial relationship between two antenna ports on the network device; and
a processor, configured to activate the secondary cell based on the activation signaling;
wherein when the first quasi co-location indication information is a transmission configuration indicator (TCI) state identifier (ID), after receiving the activation signaling of the secondary cell, the terminal device determines a receive beam based on the TCI state ID carried in the activation signaling, and receives a synchronization signal/physical broadcast channel block (SSB) by using the receive beam determined by using a TCI state corresponding to the TCI state ID, to complete activation of the secondary cell.

14. The apparatus according to claim 13, wherein the at least one piece of first quasi co-location indication information comprises the TCI state ID, a pilot resource set identifier, or spatial relation indication information.

15. The apparatus according to claim 13, wherein the receiver is further configured to:
receive a downlink physical channel or a downlink signal and send an uplink physical channel or an uplink signal in the secondary cell by using a beam indicated by using the at least one piece of first quasi co-location indication information.

16. The apparatus according to claim 13, wherein the receiver is further configured to: receive second quasi co-location indication information sent by the network device; and
receive a downlink physical channel or a downlink signal and send an uplink physical channel or an uplink signal in the secondary cell by using a beam indicated by the second quasi co-location indication information.

17. The apparatus according to claim 13, wherein the activation signaling further comprises indication information of a plurality of component carriers, and each of the at least one piece of first quasi co-location indication information corresponds to one or one group of the plurality of component carriers.

18. The apparatus according to claim 13, wherein the receiver is further configured to:
receive first indication information sent by the network device, wherein the first indication information is used to indicate that downlink timing of a primary cell is the same as that of the secondary cell, or that a timing advance group (TAG) of a primary cell is the same as that of the secondary cell.

* * * * *

UNITED STATES PATENT AND TRADEMARK OFFICE
CERTIFICATE OF CORRECTION

PATENT NO. : 12,262,313 B2
APPLICATION NO. : 17/360123
DATED : March 25, 2025
INVENTOR(S) : Xiaona Wang et al.

Page 1 of 1

It is certified that error appears in the above-identified patent and that said Letters Patent is hereby corrected as shown below:

On the Title Page

Item (57), Abstract, Line 1, delete "second" and insert -- secondary --.

Signed and Sealed this
Twenty-seventh Day of May, 2025

Coke Morgan Stewart
*Acting Director of the United States Patent and Trademark Office*